(12) United States Patent  (10) Patent No.: US 8,552,975 B2
Jung et al.  (45) Date of Patent: Oct. 8, 2013

(54) IMAGE DISPLAY APPARATUS AND METHOD FOR OPERATING THE SAME

(75) Inventors: Kyongjo Jung, Seoul (KR); Sangyong Lim, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 12/870,413

(22) Filed: Aug. 27, 2010

(65) Prior Publication Data

US 2011/0084899 A1  Apr. 14, 2011

Related U.S. Application Data

(60) Provisional application No. 61/322,614, filed on Apr. 9, 2010.

(30) Foreign Application Priority Data

Aug. 31, 2009 (KE) .......................... 10-2009-0081421

(51) Int. Cl.
*G09G 5/00* (2006.01)
*G06F 3/041* (2006.01)

(52) U.S. Cl.
USPC .......................................... 345/156; 345/173

(58) Field of Classification Search
USPC ................................. 345/156, 173, 178, 419
See application file for complete search history.

(56) References Cited

U.S. PATENT DOCUMENTS 5,977,962 A * 11/1999 Chapman et al. ............... 725/37
2005/0053090 A1 * 3/2005 Harada et al. .................. 370/464
2005/0138397 A1 6/2005 Kusudo et al.
2008/0094421 A1 * 4/2008 Maeda ........................... 345/661
2010/0017505 A1 * 1/2010 Kamada et al. ............... 709/221

FOREIGN PATENT DOCUMENTS

| KR | 10-2000-0049221 A | 7/2000 |
| KR | 10-2005-0016194 A | 2/2005 |
| KR | 10-2007-0120980 A | 12/2007 |
| KR | 10-0787787 B1 | 12/2007 |
| WO | WO 2007/066361 A1 | 6/2007 |

OTHER PUBLICATIONS

ETSI, "DVB—Middleware for Interactive Services (MIS) Advanced Middleware Study Mission Report (tm-mis-0032 rev0.15)," Draft ETSI TR xxx xxx V0.0.15, Nov. 2008, pp. 1-178, XP017825910.
Jaeger et al., "Set-Top Box Software Architectures for Digital Video Broadcast and Interactive Services," IEEE International Performance, Computing and Communications Conference, Phoenix, AZ, Apr. 4-6, 2001, pp. 287-292, XP001049962.

* cited by examiner

*Primary Examiner* — Michael Faragalla
(74) *Attorney, Agent, or Firm* — Birch, Stewart, Kolasch & Birch, LLP

(57) ABSTRACT

An image display apparatus and a method for operating the same are disclosed. The image display apparatus includes a display, a user input interface for receiving a control signal from a remote controller and processing the received control signal, a network interface for transmitting or receiving data over a network, a controller for controlling a pointer on the display according to the control signal received from the remote controller, and a platform for controlling data transmission or reception over the network according to the control signal received from the remote controller. The platform includes an Operating System (OS) kernel and an application layer that runs on the OS kernel, and the application layer including an installable or deletable application downloaded over the network.

18 Claims, 21 Drawing Sheets

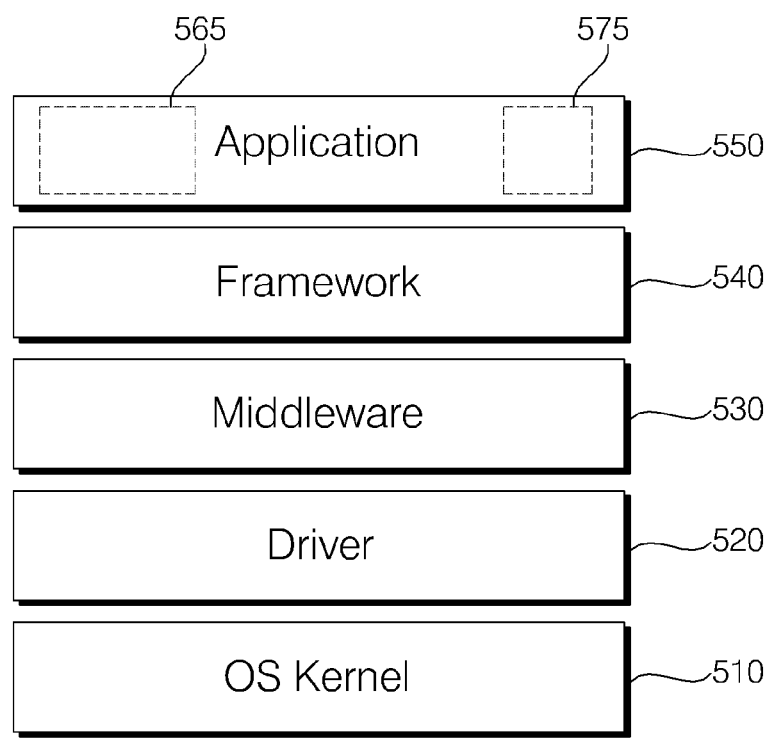

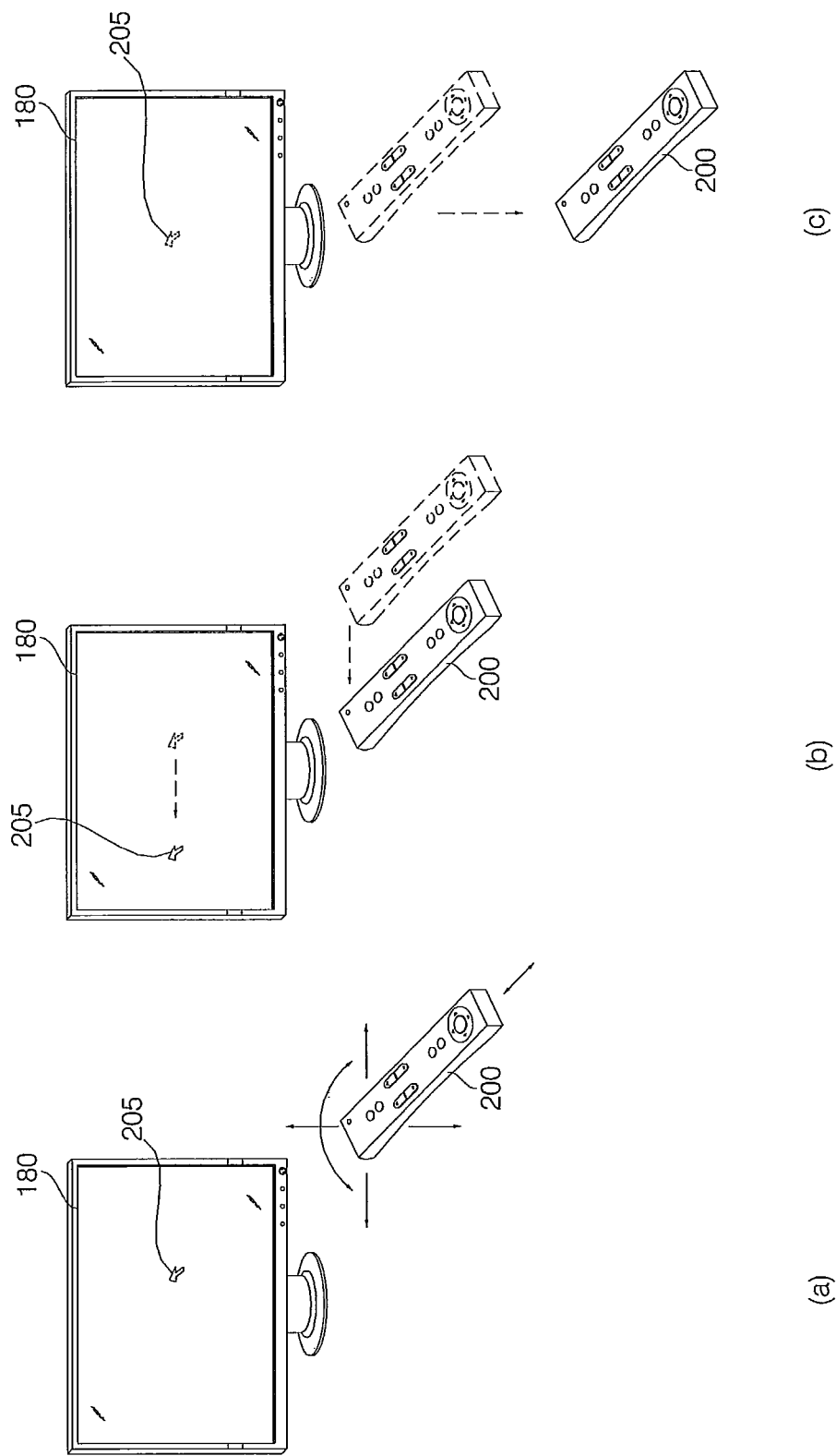

FIG. 13
(a) 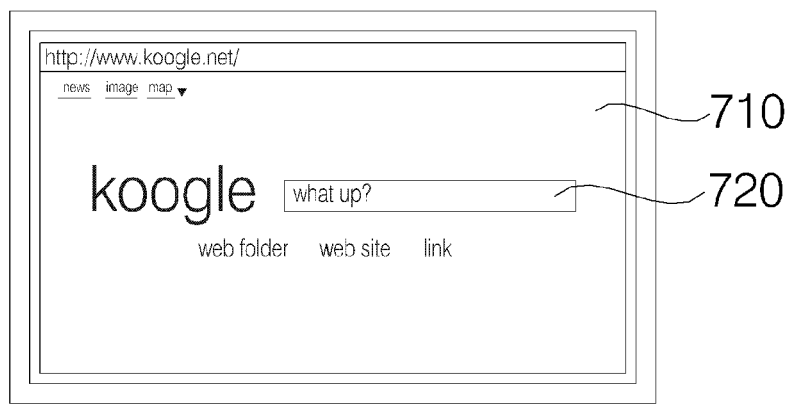
(b) 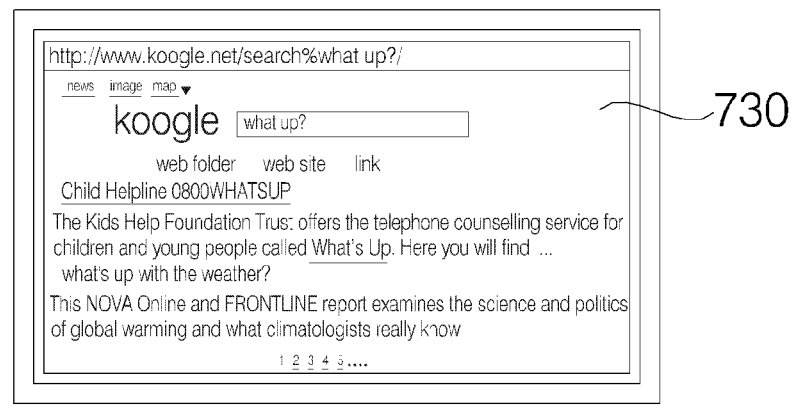

FIG. 18
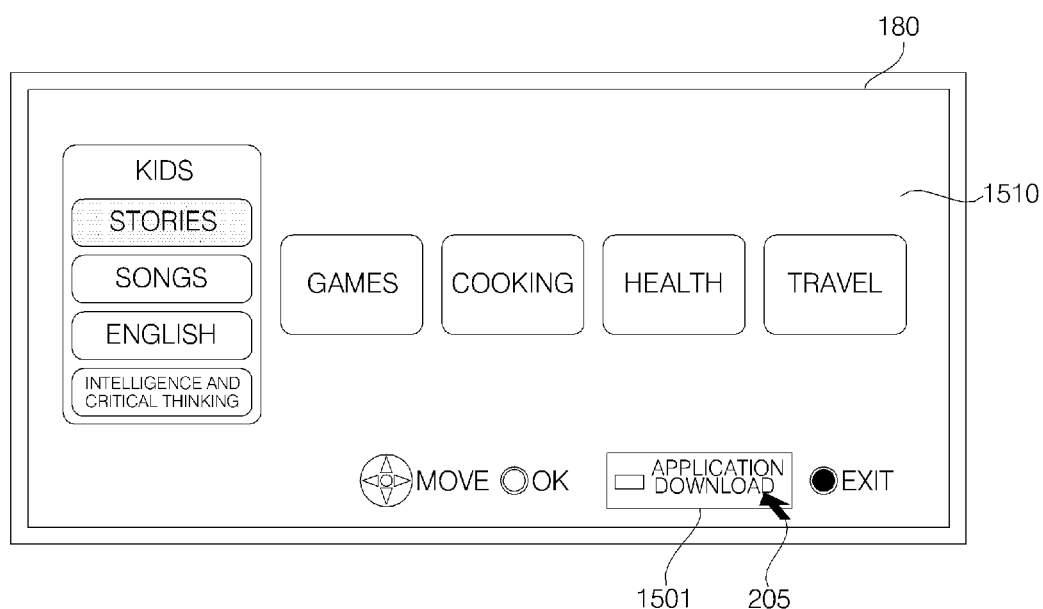
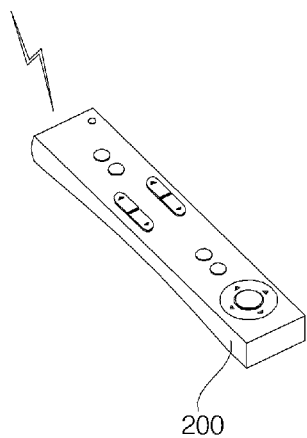

IMAGE DISPLAY APPARATUS AND METHOD FOR OPERATING THE SAME

CROSS-REFERENCE TO RELATED APPLICATION

This application claims the benefit of Korean Application No. 10-2009-0081421, filed on Aug. 31, 2009 in the Korean Intellectual Property Office and U.S. Provisional Application No. 61/322,614 filed on Apr. 9, 2010 in the USPTO, the disclosure of which is incorporated herein by reference.

BACKGROUND OF THE INVENTION

1. Field of the invention

The present invention relates to an image display apparatus and a method for operating the same, and more particularly, to an image display apparatus for increasing user convenience and a method for operating the same.

2. Description of the Related Art

An image display apparatus has a function of displaying images viewable to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting such as robustness against noise, less data loss, ease of error correction, and the ability to provide high-definition, clear images. Digital broadcasting also allows interactive services for viewers.

SUMMARY OF THE INVENTION

Therefore, the present invention has been made in view of the above problems, and it is an object of the present invention to provide an image display apparatus for increasing user convenience and a method for operating the same.

It is another object of the present invention to provide an image display apparatus for enabling a user to easily select an intended application from an application list, and a method for operating the same.

It is another object of the present invention to provide an image display apparatus for enabling a user to easily receive an intended application list, and a method for operating the same.

It is a further object of the present invention to provide an image display apparatus for providing various user interfaces, and a method for operating the same.

In accordance with an aspect of the present invention, the above and other objects can be accomplished by the provision of an image display apparatus including a display, a user input interface for receiving a control signal from a remote controller and processing the received control signal, a network interface for transmitting or receiving data over a network, a controller for controlling a pointer on the display according to the control signal received from the remote controller, and a platform for controlling data transmission or reception over the network according to the control signal received from the remote controller. The platform includes an Operating System (OS) kernel and an application layer that runs on the OS kernel, and the application layer including an installable or deletable application downloaded over the network.

In accordance with another aspect of the present invention, there is provided a method for operating an image display apparatus, including transmitting an application selection command to a content server or a network server over a network according to a control signal received from a remote controller, downloading an application corresponding to the application selection command from the content server or the network server over the network, and installing the downloaded application.

BRIEF DESCRIPTION OF THE DRAWINGS

The above and other objects, features and other advantages of the present invention will be more clearly understood from the following detailed description taken in conjunction with the accompanying drawings, in which:

FIGS. 6A and 6B illustrate exemplary platform architectures for the image display apparatus illustrated in FIG. 2;

FIGS. 7A, 7B and 7C illustrate operations of a remote controller illustrated in FIG. 2;

FIGS. 11A to 16 are views referred to for describing an operation of the image display apparatus according to an exemplary embodiment of the present invention;

FIGS. 18 and 19 are views referred to for describing the method for operating the image display apparatus, illustrated in FIG. 17.

DETAILED DESCRIPTION OF THE PREFERRED EMBODIMENTS

Exemplary embodiments of the present invention will be described below with reference to the attached drawings.

The terms "module" and "portion" attached to describe the names of components are used herein to help the understanding of the components and thus they should not be considered as having specific meanings or roles. Accordingly, the terms "module" and "portion" may be interchangeable in their use.

An image display apparatus as set forth herein is an intelligent image display apparatus equipped with a computer support function in addition to a broadcasting reception function. As the image display apparatus is capable of browsing the Internet as well as receiving broadcast programs, it may have user-friendly interfaces such as a handwriting input device, a touch screen, or a pointing device. Further, because the image display apparatus supports wired or wireless Internet, a user can enjoy e-mail transmission/reception, Web browsing, banking, gaming, etc. by connecting the image display apparatus to the Internet or a computer. For implementing these functions, the image display apparatus may operate based on a standard general-purpose Operating System (OS).

Various applications can be freely added to or deleted from the image display apparatus according to the present invention. Therefore, the image display apparatus may perform a number of user-friendly functions. The image display apparatus may be a smart TV, for example.

Figure 1:
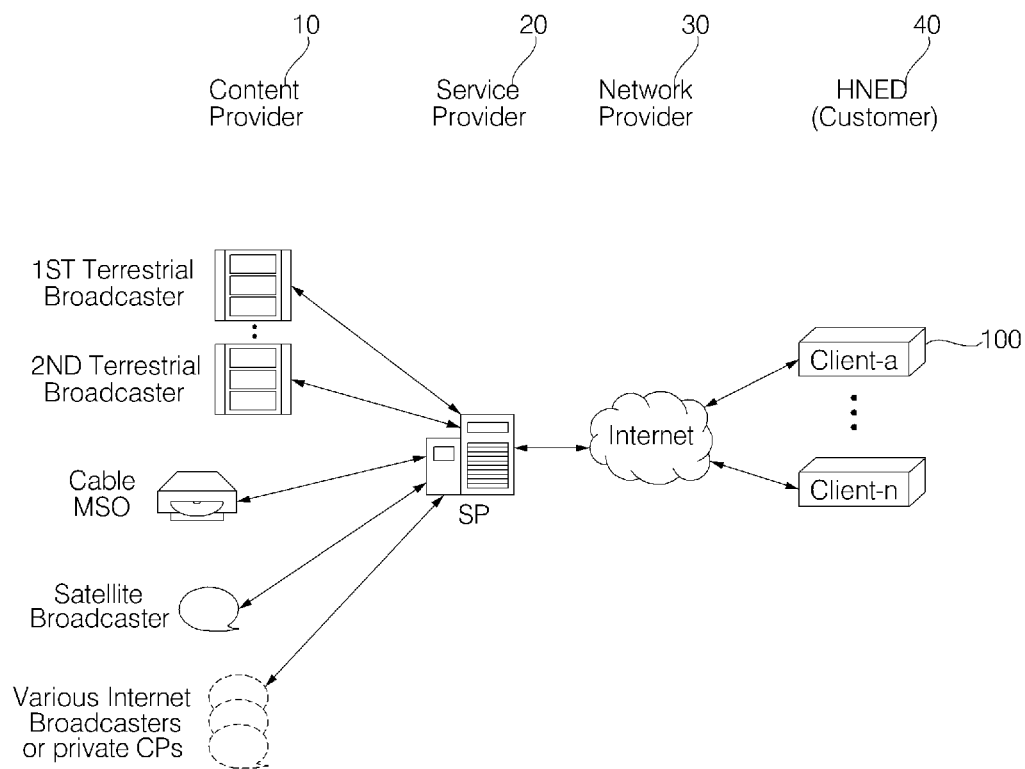
FIG. 1 illustrates the configuration of an image display system according to an exemplary embodiment of the present invention.

FIG. 1 illustrates the configuration of an image display system according to an exemplary embodiment of the present invention.

Referring to FIG. 1, from the perspective of providing content services from broadcasters, the image display system may include a Content Provider (CP) 10, a Service Provider (SP) 20, a Network Provider (NP) 30, and a customer 40.

The CP 10 creates and provides contents. The CP 10 may be, for example, a terrestrial broadcaster, a cable System Operator (SO) or Multiple System Operator (MSO), a satellite broadcaster, or an Internet broadcaster.

Besides broadcasting contents, the CP 10 may provide various applications, which will be described later with reference to FIG. 6A.

The SP 20 may provide contents received from the CP 10 in a service package. For instance, the SP 20 packages first terrestrial broadcasting, second terrestrial broadcasting, cable broadcasting, satellite broadcasting, Internet broadcasting, and applications and provides the package to users.

The SP 20 may unicast or multicast a service to the customer 40. Unicast is a type of transmission in which information is sent from only one transmitter to only one receiver. In another words, Unicast transmission is between one-to-one nodes, involving two nodes only. In an example of unicast transmission, upon receipt of a request for data from a receiver, a server transmits the data to only one receiver. Multicast is a type of transmission or communication in which transmitter transmits data to a group of receivers. For example, a server may transmit data to plurality of pre-registered receivers at one time. For this multicast registration, an Internet Group Management Protocol (IGMP) may be used.

The NP 30 may provide a network over which a service is provided to the customer 40. The customer (i.e. Home Network End User (HNED)) 40 may configure a home network and receive a service over the home network.

Contents transmitted in the above image display system may be protected by conditional access or content protection. CableCard and Downloadable Conditional Access System (DCAS) are examples of conditional access or content protection.

The customer 40 may also transmit contents over a network. In this case, the customer 40 serves as a CP and the CP 10 may receive contents from the customer 40. Therefore, a bi-directional content service or data service may be provided.

Figure 2:
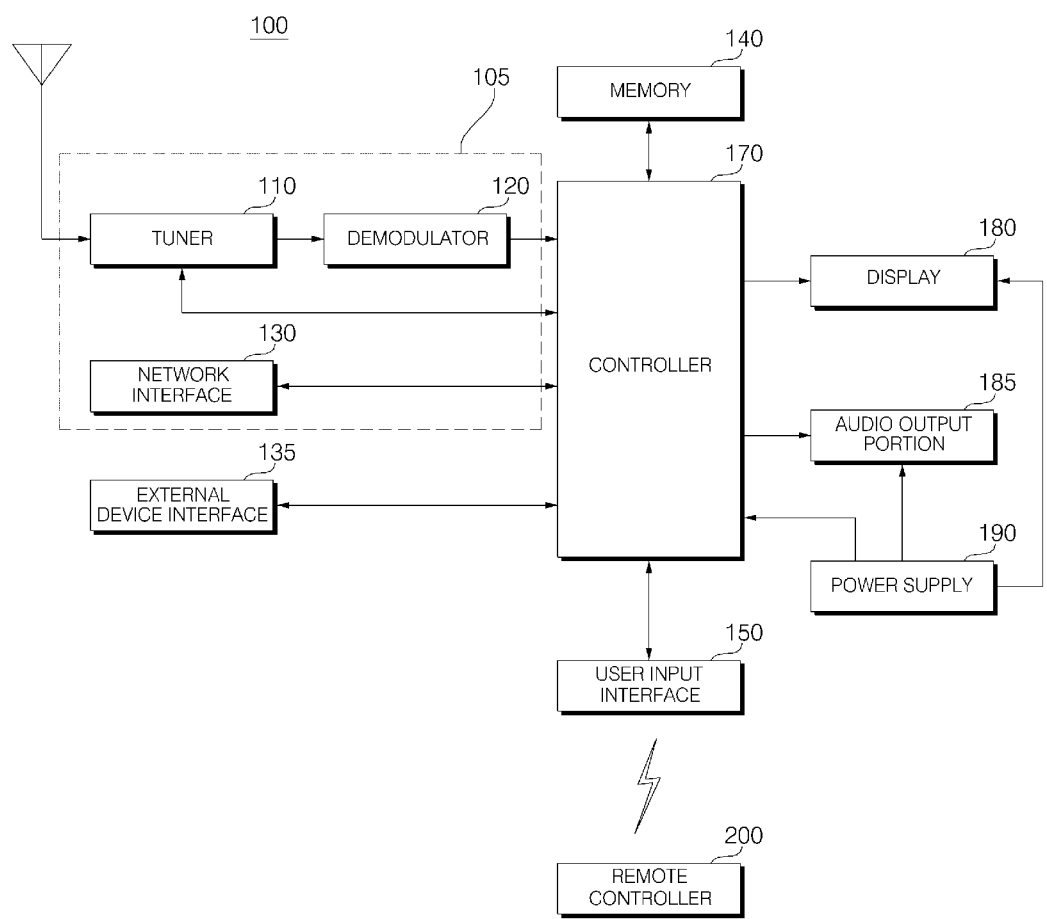
FIG. 2 is a block diagram of an image display apparatus according to an exemplary embodiment of the present invention.

FIG. 2 is a block diagram of an image display apparatus according to an exemplary embodiment of the present invention.

Referring to FIG. 2, an image display apparatus 100 according to an exemplary embodiment of the present invention includes a broadcast receiver 105, an external device interface 135, a memory 140, a user input interface 150, a controller 170, a display 180, an audio output unit 185, and a power supply 190. The broadcast receiver 105 may include a tuner 110, a demodulator 120, and a network interface 130. It is possible to selectively provide the broadcast receiver 105 with the tuner 110 and the demodulator 120, or the network interface 130.

The tuner 110 selects a Radio Frequency (RF) broadcast signal corresponding to a channel selected by a user from among a plurality of RF broadcast signals received through an antenna or an RF broadcast signal corresponding to each of pre-memorized channels and downconverts the RF broadcast signal to a digital Intermediate Frequency (IF) signal or an analog baseband Audio/Video (A/V) signal.

More specifically, if the RF broadcast signal is a digital broadcast signal, the tuner 110 downconverts the RF broadcast signal to a digital IF signal, DIF. On the other hand, if the RF broadcast signal is an analog broadcast signal, the tuner 110 downconverts the RF broadcast signal to an analog baseband Audio/Video (A/V) signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be able to receive RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously memorized in the image display apparatus 100 by a channel-add function from a plurality of RF signals received through the antenna, and may downconvert the selected RF broadcast signals to IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For the channel decoding, the demodulator 120 may include a Trellis decoder (not shown), a deinterleaver (not shown) and a Reed-Solomon decoder (not shown) and thus perform Trellis decoding, deinterleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For the channel decoding, the demodulator 120 may include a convolution decoder (not shown), a deinterleaver (not shown), and a Reed-Solomon decoder (not shown) and thus perform convolutional decoding, deinterleaving, and Reed-Solomon decoding.

The demodulator 120 may perform demodulation and channel decoding on the digital IF signal DIF received from the tuner 120, thereby obtaining a stream signal TS. The stream signal TS may be a signal in which a video signal, an audio signal and a data signal are multiplexed. For example, the stream signal TS may be a Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may interface between an external device and the image display apparatus 100. For the interfacing, the external device interface 135 may include an A/V Input/Output (I/O) portion (not shown) or a wireless communication module (not shown).

The external device interface 135 may be connected wirelessly or wiredly to an external device such as a Digital Versatile Disc (DVD), a Blu-ray disc, a gaming device, a camera, a camcorder, or a computer (e.g., a laptop computer). Then, the external device interface 135 receives video, audio, and/or data signals from the external device and transmits the received external input signals to the controller 170. In addition, the external device interface 135 may output video, audio, and data signals processed by the controller 170 to the external device. In order to receive or transmit audio and video signals from or to the external device, the external device interface 135 may include the A/V I/O portion (not shown) or the wireless communication module (not shown).

To provide the video and audio signals received from the external device to the image display apparatus 100, the A/V I/O portion may include a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module may perform short-range wireless communication with other electronic devices. For the short-range wireless communication over a network, the wireless communication module may operate in compliance with communication standards such as Bluetooth, Radio-Frequency IDentification (RFID), Infrared Data Association (IrDA), Ultra WideBand (UWB), and ZigBee.

The external device interface 135 may be connected to various set-top boxes through at least one of the USB port, the CVBS port, the component port, the S-video port, the DVI port, the HDMI port, the RGB port, and the D-sub port and may thus receive data from or transmit data to the various set-top boxes.

The external device interface 135 may receive applications or an application list from an adjacent external device and provide the applications or the application list to the controller 170 or the memory 140.

The network interface 130 interfaces between the image display apparatus 100 and a wired/wireless network. The network interface 130 may include an Ethernet port for connection to a wired network. For connection to wireless networks, the network interface may use Wireless Local Area Network (WLAN) (i.e., Wi-Fi), Wireless Broadband (Wibro), World Interoperability for Microwave Access (WiMax), and High Speed Downlink Packet Access (HSDPA).

The network interface 130 may access a specific Web page over a network. That is, the network interface 130 may access a specific Web page over a network and transmit or receive data to or from a server. Besides, the network interface 130 may receive contents or data from a CP or an NP. Specifically, the network interface 130 may receive contents including movies, advertisements, games, Video on Demand (VoD) files, and broadcast signals, and information related to the contents from a CP or an NP. Also, the network interface 130 may receive update information about firmware and update files of the firmware from the NP. The network interface 130 may transmit data to the Internet, the CP or the NP.

The network interface 130 may selectively receive a desired application among open applications over a network.

The memory 140 may store various programs for processing and controlling signals by the controller 170, and may also store processed video, audio and data signals.

The memory 140 may temporarily store a video, audio and/or data signal received from the external device interface 135 or the network interface 130. The memory 140 may memorize broadcast channels by the channel-add function.

The memory 140 may store the applications or the application list received from the external device interface 135 or the network interface 130.

The memory 140 may include, for example, at least one of a flash memory-type memory medium, a hard disc-type memory medium, a multimedia card micro-type memory medium, a card-type memory (e.g. a Secure Digital (SD) or eXtreme Digital (XD) memory), a Random Access Memory (RAM), and a Read-Only Memory (ROM) such as Electrical Erasable and Programmable ROM (EEPROM). The image display apparatus 100 may play content files stored in the memory 140 (e.g. video files, still image files, music files, text files, and application files), for the user.

While the memory 140 is shown in FIG. 2 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal or control signal received from a sensor unit (not shown) for sensing a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals so that the processed signals can be output as audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output through the external device interface 135.

While not shown in FIG. 2, the controller 170 may include a demultiplexer and a video processor, which will be described later with reference to FIG. 5.

Besides, the controller 170 may provide overall control to the image display apparatus 100. For example, the controller 170 may control the tuner 110 to select an RF broadcast signal corresponding to a user-selected channel or a pre-memorized channel.

The controller 170 may control the image display apparatus 100 according to a user command received through the user input interface 150 or according to an internal program. Especially the controller 170 may access a network and download a user-desired application or an application list to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video play command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) moving picture or still image.

When an application view menu item is selected, the controller 170 may control the display 180 to display applications or an application list available in the image display apparatus 100 or downloadable from an external network.

The controller 170 may control installation and execution of applications downloaded from the external network by use of various user interfaces. In addition, the controller 170 may control the display 180 to display an image related to a user-selected application that is executed.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 135 and display the extracted video frames on the display 180 as thumbnail images. The thumbnail images may be output to the controller 170 after they are encoded or as they are. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user may intuitively identify the contents of broadcast programs received through a plurality of channels.

The display 180 may convert a processed video signal, a processed data signal, and an On Screen Display (OSD) signal received from the controller 170 or a video signal and a data signal received from the external device interface 135 to RGB signals, thereby generating driving signals.

The display 180 may be implemented into various types of displays such as a Plasma Display Panel (PDP), a Liquid Crystal Display (LCD), an Organic Light-Emitting Diode (OLED), a flexible display, and a 3D display.

The display 180 may also be implemented as a touch screen so that it is used not only as an output device but also as an input device.

The audio output unit 185 may receive a processed audio signal (e.g., a stereo signal, a 3.1-channel signal or a 5.1-channel signal) from the controller 170 and output the received audio signal as voice. The audio output unit 185 may be implemented into various types of speakers.

The image display apparatus 100 may further include a camera portion (not shown) for capturing the user. The camera portion may be implemented with one camera, to which the present invention is not limited. Hence, the camera portion may include a plurality of cameras. Image information captured by the camera portion is transmitted to the controller 170.

To sense a user's gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The controller 170 may sense a user's gesture from an image captured by the camera portion or a signal sensed by the sensor unit, or by combining the captured image and the sensed signal.

The power supply 190 supplies power to the image display apparatus 100. Particularly, the power supply 190 may supply power to the controller 170 that can be implemented as a System On Chip (SOC), the display 180 for displaying images, and the audio output unit 185 for audio output.

For supplying power, the power supply 190 may include a converter (not shown) for converting alternate current to Direct Current (DC). If the display 180 is configured with, for example, a liquid crystal panel having a plurality of backlight lamps, the power supply 190 may further include an inverter (not shown) capable of performing a Pulse Width Modulation (PWM) operation for luminance change or dimming driving.

The remote controller 200 transmits a user input to the user input interface 150. For the transmission of a user input, the remote controller 200 may use various communication techniques such as Bluetooth, RF, IR, Ultra WideBand (UWB) and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

Alternatively, the image display apparatus 100 may be a wireless type without the display 180 and the audio output unit 185 illustrated in FIG. 2, which transmits and receives data to and from the display 180 and the audio output unit 185 by radio communication.

The block diagram of the image display apparatus 100 illustrated in FIG. 2 is an exemplary embodiment of the present invention. Depending on the specification of the image display apparatus 100 in real implementation, the components of the image display apparatus 100 may be incorporated, added or omitted. That is, two or more components are incorporated into one component or one component may be configured as separate components, when needed. In addition, the function of each block is described for the purpose of describing the exemplary embodiment of the present invention and thus specific operations or devices should not be construed as limiting the scope and spirit of the present invention.

Unlike FIG. 2, the image display apparatus 100 may not have the tuner 100 and the demodulator 120 illustrated in FIG. 2 and thus may receive and play video contents through the network interface 130 or the external device interface 135.

The image display apparatus 100 is an example of an image signal processing apparatus that processes a video signal corresponding to an input or stored image. Another example of the image signal processing apparatus may be a set-top box that does not include the display 180 illustrated in FIG. 2, a DVD player, a Blu-ray player, a game player, or a computer. Now a description will be made of the set-top box with reference to FIGS. 3A and 3B.

Figure 3A:
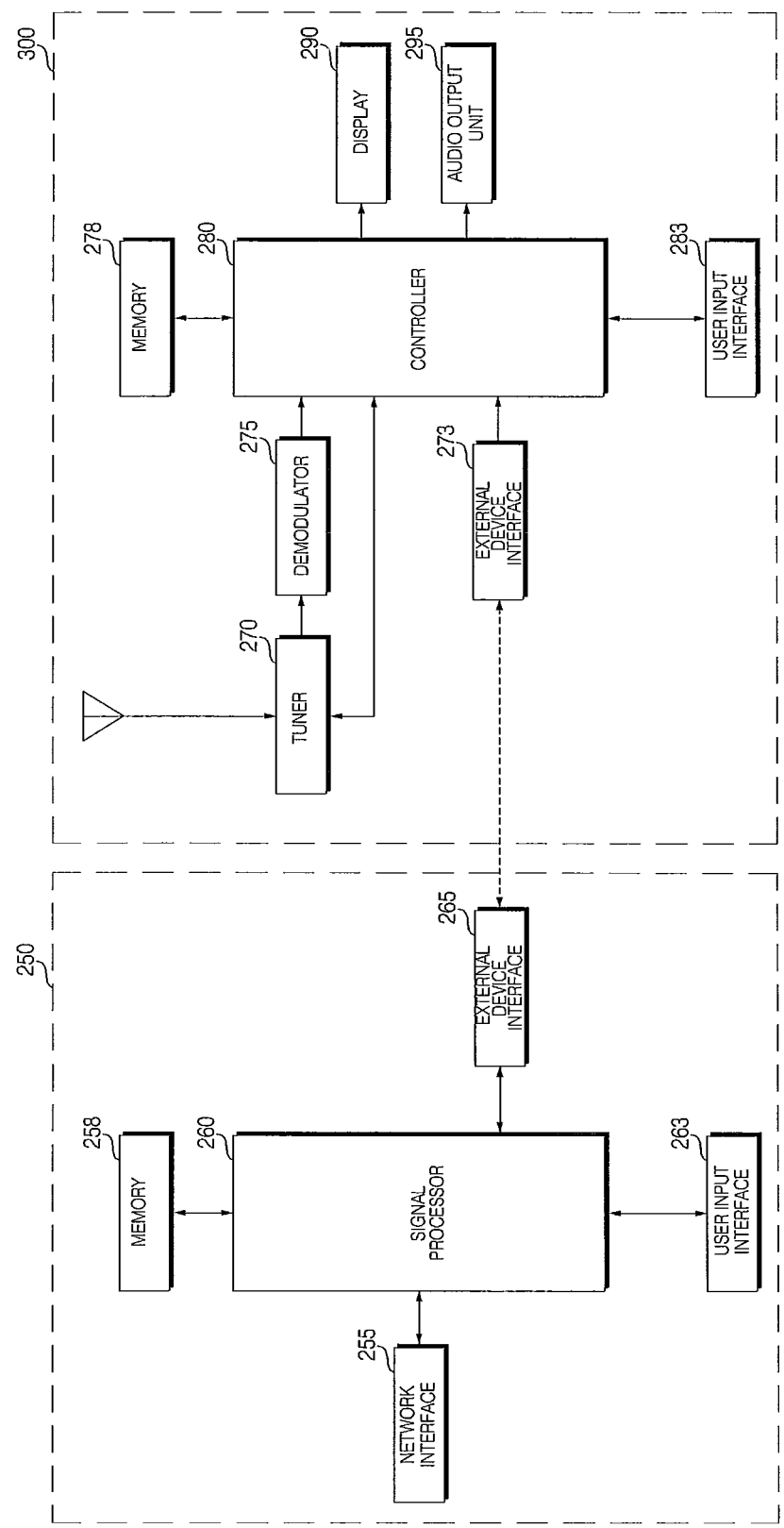
FIGS. 3A and 3B are block diagrams of a set-top box and a display device according to exemplary embodiments of the present invention.
Figure 3B:
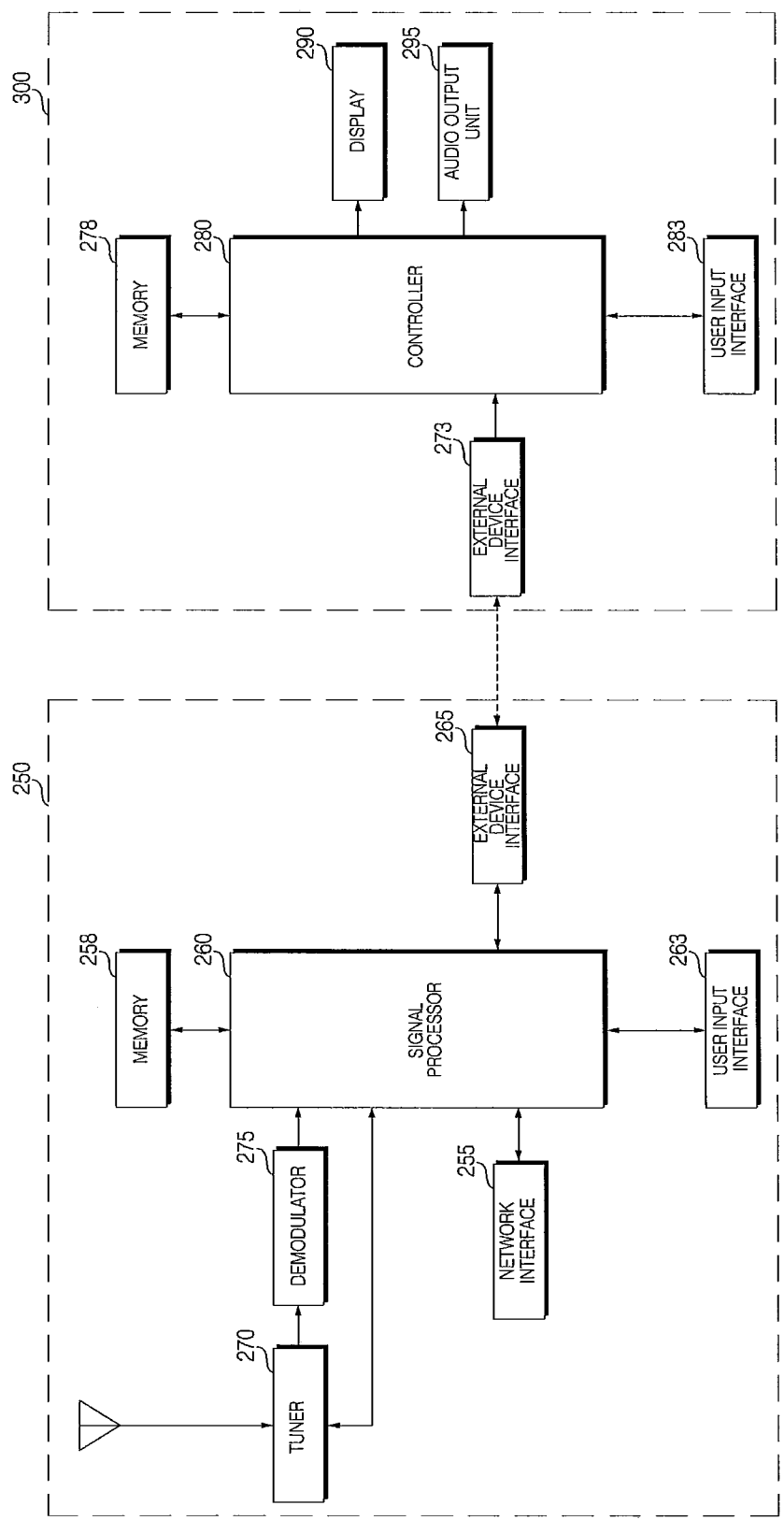

FIGS. 3A and 3B are block diagrams of a set-top box and a display device according to exemplary embodiments of the present invention.

Referring to FIG. 3A, a set-top box 250 and a display device 300 may transmit data to or receive data from each other wirelessly or wiredly. The following description will focus on the difference between the set-top box 250 and the display device 300 illustrated in FIGS. 3A and 3B and the image display apparatus illustrated in FIG. 2.

The set-top box may include a network interface 255, a memory 258, a signal processor 260, a user input interface 263, and an external device interface 265.

The network interface 255 provides interfacing with a wired/wireless network including the Internet. The network interface 255 may also transmit data to or receive data from other users or other electronic devices over a connected network or another network linked to the connected network.

The memory 258 may store programs for signal processing and control operations of the signal processor 260 and temporarily store video, audio and/or data signals received from the external device interface 265 or the network interface 255. The memory 258 may further store platforms illustrated in FIGS. 6A and 6B which will be described later.

The signal processor 260 processes an input signal. For example, the signal processor 260 demultiplexes or decodes an input video signal or audio signal. For the demultiplexing or decoding, the signal processor 260 may include a video decoder or an audio decoder. The processed video signal or audio signal may be transmitted to the display device 300 through the external device interface 265.

The user input interface 263 transmits a user-input signal to the signal processor 260 or transmits a signal received from the signal processor 260 to a user. For example, the user input interface 263 may transmit various control signals received through a local key (not shown) or the remote controller 200, such as a power on/off signal, an operation input signal, and a setting input signal, to the signal processor 260.

The external device interface 265 provides interfacing with a wiredly or wirelessly connected external device, particularly the display device 300, for data transmission or reception. Besides, the external device interface 265 may provide interfacing with an external device such as a game player, a camcorder, and a laptop computer, for data transmission or reception.

The set-top box 250 may further include a media input unit (not shown) to play media. The media input unit may be a Blu-ray input unit (not shown). That is, the set-top box 250 may include a Blu-ray player. Media played from a Blue-ray disc may be demultiplexed or decoded in the signal processor 260 and then transmitted to the display device 300 through the external device interface 265 so that the media is displayed.

The display device 300 may include a tuner 270, an external device interface 273, a demodulator 275, a memory 278, a controller 280, a user input interface 283, a display 290, and an audio output unit 295.

Since the tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185, a description of them will not be provided herein.

The external device interface 273 interfaces with a wiredly or wirelessly connected external device, particularly the set-top box 250, for data transmission or reception.

Therefore, a video signal or audio signal received from the set-top box 250 is output to the display 290 or the audio output unit 295 through the controller 280.

Referring to FIG. 3B, the set-top box 250 and the display device 300 are essentially the same as the set-top box 250 and the display device 300 illustrated in FIG. 3A, except that the tuner 270 and the demodulator 275 reside in the set-top box 250, not in the display device 300. The following description will be made of the difference between FIGS. 3A and 3B.

The signal processor 260 may process a broadcast signal received through the tuner 270 and the demodulator 275. The user input interface 263 may receive an input such as a channel selection input, a channel store input, etc.

Figure 4:
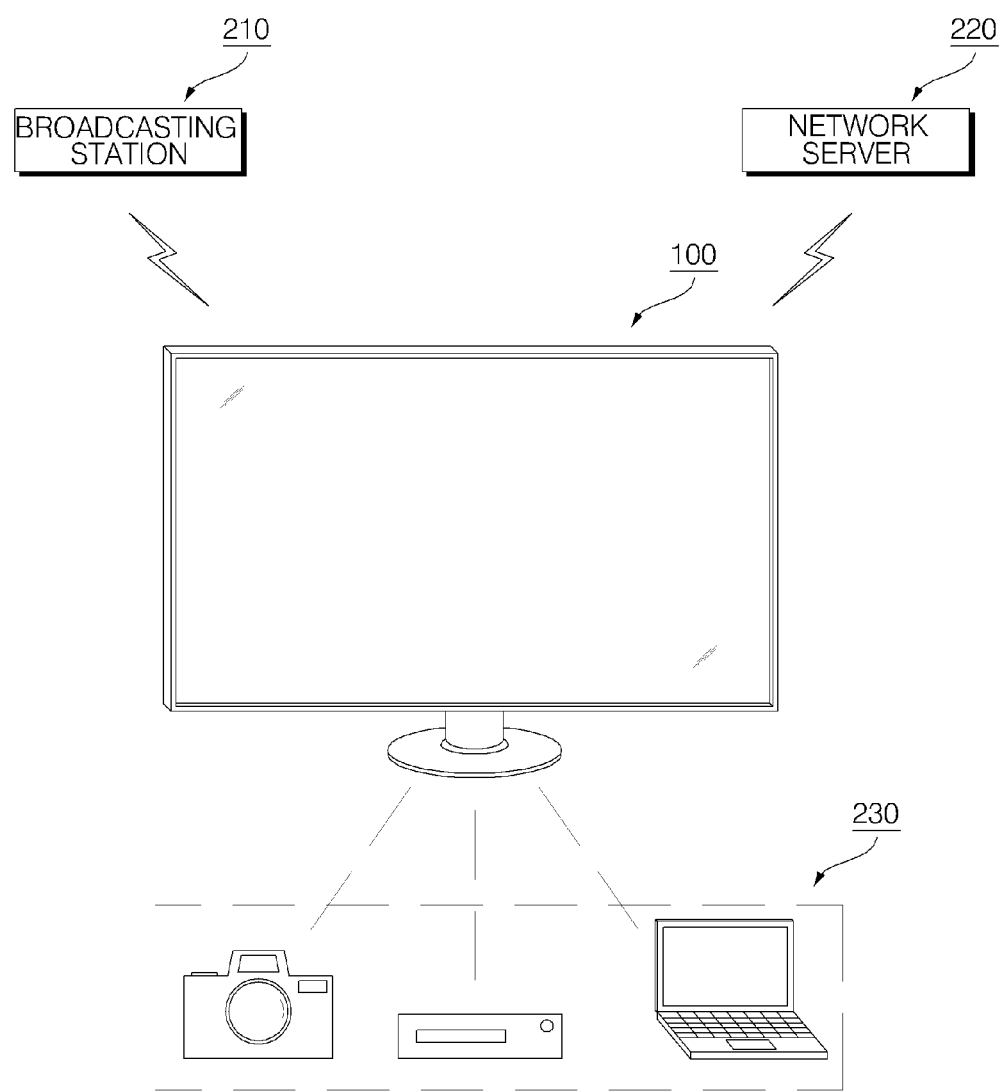
FIG. 4 illustrates devices capable of transmitting and receiving data to and from the image display apparatus illustrated in FIG. 2.

FIG. 4 illustrates devices capable of transmitting and receiving data to and from the image display apparatus illustrated in FIG. 2.

Referring to FIG. 4, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, to be suitable for being output from the image display apparatus 100. The image display apparatus may output images or sound based on the processed video or audio signal.

Meanwhile, the image display apparatus 100 may communicate with the network server 220. The network server 200 is a device that transmits and receives signals to and from the image display apparatus 100 over a network. For example, the network server 220 may be a portable terminal that can be connected to the image display apparatus 100 through a wired or wireless base station. In addition, the network server 200 may provide contents to the image display apparatus 100 over the Internet. A CP may provide contents to the image display apparatus 100 through the network server 220.

The image display apparatus 100 may communicate with the external device 230. The external device 230 can transmit and receive signals directly to and from the image display apparatus wirelessly or by cable. For instance, the external device 230 may be a media memory or a player. That is, the external device 230 may be any of a camera, a DVD, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230, and a signal received from the external device 230 to the broadcasting station 210 or the network server 220. That is, the image display apparatus 100 may transmit contents included in signals received from the broadcasting station 210, the network server 220, and the external device 230, as well as reproduce them directly.

Figure 5:
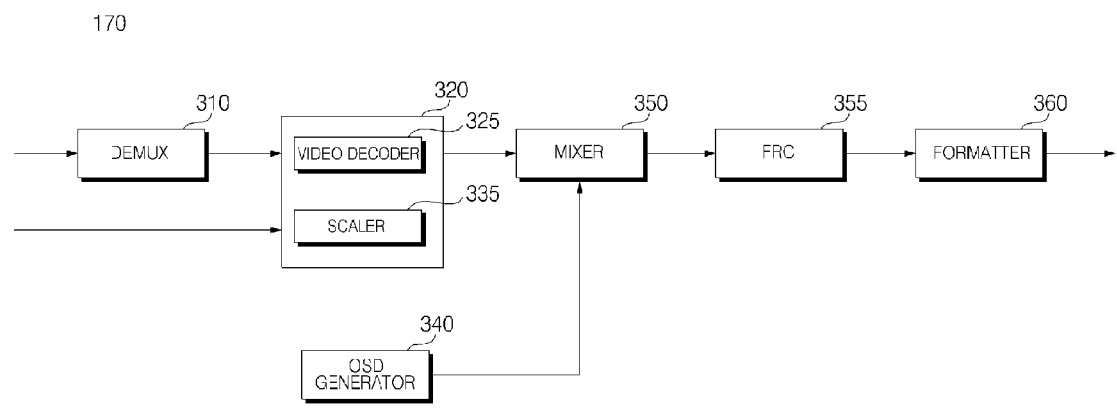
FIG. 5 is a block diagram of a controller illustrated in FIG. 2.

FIG. 5 is a block diagram of the controller illustrated in FIG. 2.

Referring to FIG. 5, the controller 170 may include a Demultiplexer (DEMUX) 310, a video processor 320, an OSD generator 340, a mixer 350, a Frame Rate Converter (FRC) 355, and a formatter 360 according to an exemplary embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For the video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

If the demultiplexed video signal is, for example, an MPEC-2 coded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal on its own or according to a user input. For example, the OSD generator 340 may generate signals by which a variety of information is displayed as graphic images or text on the display 180, according to user input signals or control signals. The OSD signal may include various data such as a User Interface (UI) screen, a variety of menu screens, widgets, icons, etc.

For example, the OSD generator 340 may generate a signal by which a caption of a broadcast image or Electronic Program Guide (EPG)-based broadcasting information is displayed.

The mixer 350 may mix the decoded video signal with the OSD signal and output the mixed signal to the formatter 360. As the decoded broadcast video signal or the external input signal is mixed with the OSD signal, an OSD may be displayed, overlaid on the broadcast image or the external input image.

The FRC 355 may change the frame rate of an input image. For example, a frame rate of 60 Hz is converted to a frame rate of 120 or 240 Hz. When the frame rate is changed from 60 Hz to 120 Hz, the same first frame is inserted between a first frame and a second frame, or a predicted third frame is inserted between the first and second frames. If the frame rate is changed from 60 Hz to 480 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal to an RGB data signal. The RGB signal may be output in the form of a Low Voltage Differential Signal (LVDS) or mini-LVDS.

The audio processor (not shown) of the controller 170 may process the demultiplexed audio signal. For the audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the base, treble, and volume of the audio signal.

The data processor (not shown) of the controller 170 may process the data signal obtained by demultiplexing the input stream signal. For example, if the data signal is an encoded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The block diagram of the controller 170 illustrated in FIG. 5 is an exemplary embodiment of the present invention. Depending on the specification of the controller 170 in real implementation, the components of the controller 170 may be incorporated, added or omitted.

Figure 6A:
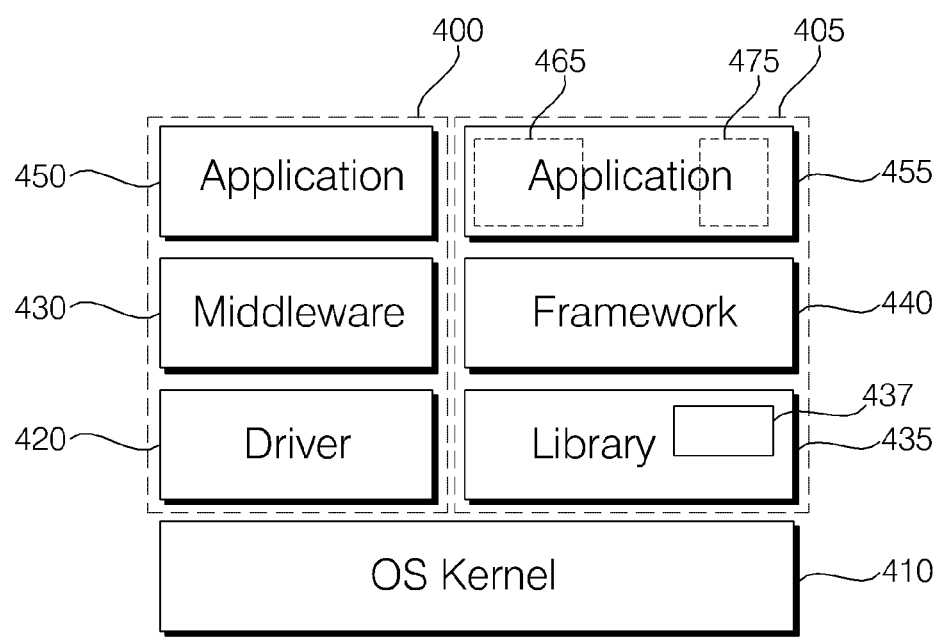

FIGS. 6A and 6B illustrate exemplary platform architectures for the image display apparatus illustrated in FIG. 2.

A platform for the image display apparatus 100 may have OS-based software to implement the above-described various operations according to an exemplary embodiment of the present invention.

Referring to FIG. 6A, a platform for the image display apparatus 100 is a separate type according to an exemplary embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is a core of an operating system. When the image display apparatus 100 is driven, the OS kernel 410 may be responsible for at least one of hardware driver driving, security protection for hardware and processors in the image display apparatus 100, efficient management of system resources, memory management, hardware interfacing by hardware abstraction, multi-processing, and scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, and a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 lies between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in interaction with the hardware drivers of the OS kernel 410.

In addition, the driver 420 may further include a driver for the remote controller 200, especially a later-described pointing device. The remote controller driver may reside in the OS kernel 410 or the middleware 430, instead of the driver 420.

The middleware 430 sits between the OS kernel 410 and the application layer 450. The middleware 430 may mediate between different hardware devices or different software programs, for data transmission and reception between the hard devices or software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcast information-related middleware, and Digital Living Network Alliance (DLNA) middleware as peripheral device communication-related middleware.

The application layer 450 that resides on the middleware 430 in the legacy system platform 400 may include, for example, UI applications associated with various menus in the image display apparatus 100. The application layer 450 may allow editing and updating over a network by user selection. With use of the application layer 450, the user may enter a desired menu among various UIs by manipulating the remote controller 200 during viewing a broadcast program.

The application layer 450 may further include at least one of a TV guide application, a Bluetooth application, a reservation application, a Digital Video Recorder (DVR) application, and a hotkey application.

In the smart system platform 405, the library 435 lies between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library such as specifying a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include support programs and programs for interconnecting between different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus 100. The application layer 455 may include, for example, a core application that has at least one of e-mail, Short Message Service (SMS), a calendar, a map, and a browser. The application layer 455 may be written in Java.

In the application layer 455, applications may be categorized into user-undeletable applications 465 stored in the image display apparatus 100 and user-installable or user-deletable applications 475 that are downloaded from an external device or a network and stored in the image display apparatus 100.

With the applications of the application layer 455, a variety of functions may be performed by network access, including Internet telephony, VoD, Web album, Social Networking Service (SNS), Location-Based Service (LBS), map service, Web browsing, and application search. In addition, the user may enjoy games and manage his schedule using applications.

Referring to FIG. 6B, a platform for the image display apparatus 100 according to another exemplary embodiment of the present invention is an integrated type. The integrated platform may include an OS kernel 510, a driver 520, middleware 530, a framework 540, and an application layer 550.

Compared to the separate-type platform illustrated in FIG. 6A, the integrated-type platform is characterized by the absence of the library 435 and the application layer 550 being an integrated layer. The driver 520 and the framework 540 correspond to the driver 420 and the framework 440 of FIG. 6A, respectively.

The library 435 of FIG. 6A may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcast information-related middleware, and DLNA middleware as peripheral device communication-related middleware, whereas the image display system middleware includes SSL as a security-related library, WebKit as a Web engine-related library WebKit, libc, and Media Framework as a media-related library. The middleware 530 may further include the afore-described runtime.

The application layer 550 may include menu-related applications, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 5 and 6 may be general-purpose ones that can be implemented in many other electronic devices as well as in image display apparatuses. The platforms may be loaded on the memory 140, the controller 170, or any other processor (not shown).

FIGS. 7A, 7B and 7C illustrate operations of the remote controller illustrated in FIG. 2.

Referring to FIGS. 7A, 7B and 7C, the remote controller 200 may transmit and receive signals to and from the image display apparatus 100 according to an RF or IR communication standard.

FIG. 7A illustrates a screen on which a pointer 205 representing the movement of the remote controller 200 is displayed.

The user may move the remote controller 200 up and down, side to side (FIG. 7B), and back and forth (FIG. 7C). The pointer 205 moves in accordance with the movement of the remote controller 200 as illustrated in FIGS. 7A, 7B and 7C. In this context, the remote controller 200 may be referred to as a pointing device.

Referring to FIG. 7B, if the user moves the remote controller 200 to the left, the pointer 205 moves to the left accordingly. A sensor of the remote controller 200 detects the movement of the remote controller 200 and transmits motion information corresponding to the result of the detection to the image display apparatus 100. Then, the image display apparatus 100 determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus 100 then displays the pointer 205 at the calculated coordinates.

Referring to FIG. 7C, while pressing a predetermined button of the remote controller 200, the user moves the remote controller 200 farther from the display 180. Then, a selected area corresponding to the pointer 205 may be zoomed-in and enlarged on the display 180. On the contrary, if the user moves the remote controller 200 toward the display 180, the selection area corresponding to the pointer 205 is zoomed-out and thus contracted on the display 180. The opposite case is possible. That is, when the remote controller 200 recedes from the display 180, the selection area may be zoomed-out and when the remote controller 200 approaches the display 180, the selection area may be zoomed-in.

With the predetermined button pressed in the remote controller 200, the up, down, left and right movements of the remote controller 200 may not be sensed as meaningful. That is, when the remote controller 200 recedes from or approaches the display 180, only the back and forth movements of the remote controller 200 are sensed, while the up, down, left and right movements of the remote controller 200 are neglected. Unless the predetermined button is kept pressed in the remote controller 200, the pointer 205 moves in accordance with the up, down, left or right movement of the remote controller 200.

The moving speed and direction of the pointer 205 may correspond to the moving speed and direction of the remote controller 200.

The pointer 205 is an object displayed on the display 180 in correspondence with the movement of the remote controller 200. Therefore, objects of various shapes other than an arrow illustrated in FIGS. 7A, 7B and 7C are available for the pointer 205. For example, the pointer 205 may be shaped into a dot, a cursor, a prompt, a thick outline, etc. The pointer 205 may be displayed across a plurality of points, such as a line and a surface, as well as at a single point on horizontal and vertical axes.

Figure 8:
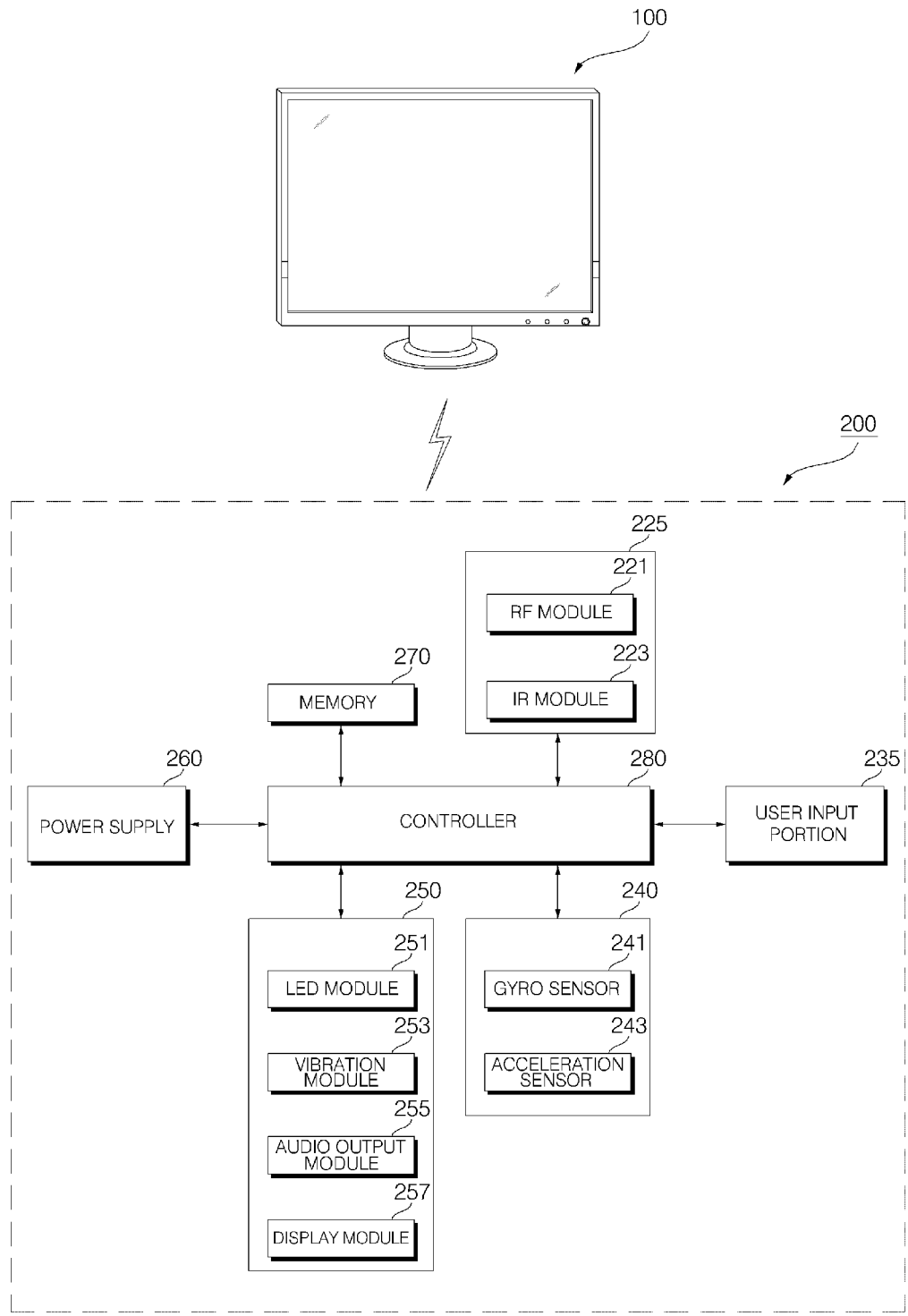
FIG. 8 is a block diagram of the remote controller illustrated in FIG. 2.

FIG. 8 is a detailed block diagram of the remote controller illustrated in FIG. 2.

Referring to FIG. 8, the remote controller 200 may be a pointing device. The pointing device 200 may include a wireless communication module 225, a user input portion 235, a sensor unit 240, an output portion 250, a power supply 260, a memory 270, and a controller 280.

The wireless communication module 225 transmits signals to and/or receives signals from the image display apparatus 100. The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The pointing device 200 transmits motion information representing the movement of the pointing device 200 to the image display apparatus 100 through the RF module 221 in this exemplary embodiment. The pointing device 200 may also receive signals from the image display apparatus 100 through the RF module 221. When needed, the pointing device 200 may transmit commands to the image display apparatus 100 through the IR module 223, such as a power on/off command, a channel switching command, or a sound volume change command.

The user input portion 235 may include a keypad, a plurality of buttons, a touchpad and/or a touch screen. The user may enter commands to the image display apparatus 100 by manipulating the user input portion 235. If the user input portion 235 includes a plurality of hard-key buttons, the user may input various commands to the image display apparatus 100 by pressing the hard-key buttons. Alternatively or additionally, if the user input portion 235 includes a touch screen displaying a plurality of soft keys, the user may input various commands to the image display apparatus 100 by touching the soft keys. The user input portion 235 may also include various input tools other than those set forth herein, such as a scroll key and/or a jog key, which should not be construed as limiting the present invention.

The sensor unit 240 may include a gyro sensor 241 and/or an acceleration sensor 243. The gyro sensor 241 may sense the movement of the pointing device 200, for example, in X-, Y-, and Z-axis directions, and the acceleration sensor 243 may sense the moving speed of the pointing device 200.

The output portion 250 may output a video and/or audio signal corresponding to a manipulation of the user input portion 235 or corresponding to a signal received from the image display apparatus 100. The user may easily identify whether the user input portion 235 has been manipulated or whether the image display apparatus 100 has been controlled, based on the video and/or audio signal output by the output portion 250.

The output portion 250 may include a Light Emitting Diode (LED) module 351 which is turned on or off whenever the user input portion 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the pointing device 200. If the pointing device 200 is kept stationary for a predetermined time or longer, the power supply 260 may, for example, reduce or cut off supply of power to the pointing device 200 in order to save power. The power supply 260 may resume the power supply if a predetermined key on the pointing device 200 is manipulated.

The memory 270 may store various application data required for controlling or driving the pointing device 200. The pointing device 200 may wirelessly transmit signals to and/or receive signals from the image display apparatus 100 in a predetermined frequency band with the aid of the RF module 221. The controller 280 of the pointing device 200 may store information regarding the frequency band used for the pointing device 200 to wirelessly transmit signals to and/or wirelessly receive signals from the paired image display apparatus 100 in the memory 270 and may then refer to this information for a later use.

The controller 280 provides overall control to the pointing device 200. For example, the controller 280 may transmit a signal corresponding to a key manipulation detected from the user input portion 235 or a signal corresponding to a motion of the pointing device 200, as sensed by the sensor unit 240, to the image display apparatus 100.

Figure 9:
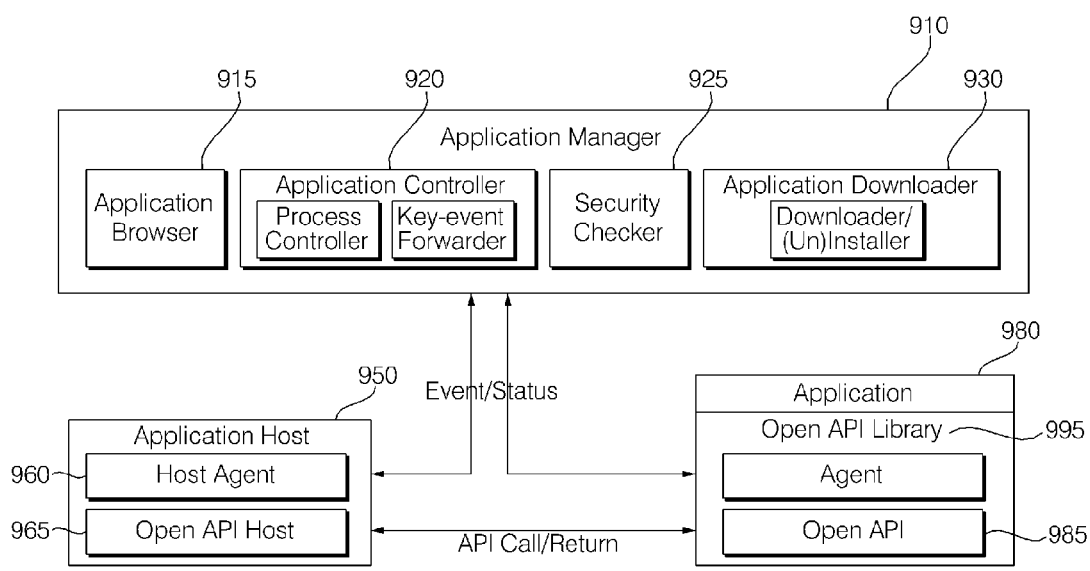
FIG. 9 illustrates a structure for implementing applications in the image display apparatus according to an exemplary embodiment of the present invention.

FIG. 9 illustrates a structure for implementing applications in the image display apparatus according to an exemplary embodiment of the present invention.

Referring to FIG. 9, the image display apparatus 100 may include an application manager 910 and an application host 950, for implementing applications. The application manager 910 and the application host 950 may reside in the aforedescribed controller 170, for example, in a processor (not shown) of the controller 170.

The application manager 910 is responsible for overall management of applications, such as installation, execution, management, and deletion. The overall management may cover installation of an add-on application by a third party.

The application manager 910 may include an application browser 915 for executing applications, an application controller 920 for managing and providing overall control to applications, a security checker 925 for ensuring security for application installation, execution, management and deletion, and an application downloader 930 for installing applications.

The application host 950 is added to the image display apparatus 100 in order to support running of the application manager 910. The application host 950 may include a host agent 960 and an open Application Programming Interface (API) host 965.

The host agent 960 transmits and receives status information about host software of the image display apparatus 100 and key events of the remote controller 200.

The open API host 965 calls an open API 985 of an application 980 and receives a response. The application 980 transmits the open API 985 in response to the call from the open API host 965. The open API 985 may be provided in the form of an open API library 995. The application 980 may register to the application manager 910 through the open API library 995 and thus use functions provided by the host software.

Figure 10:
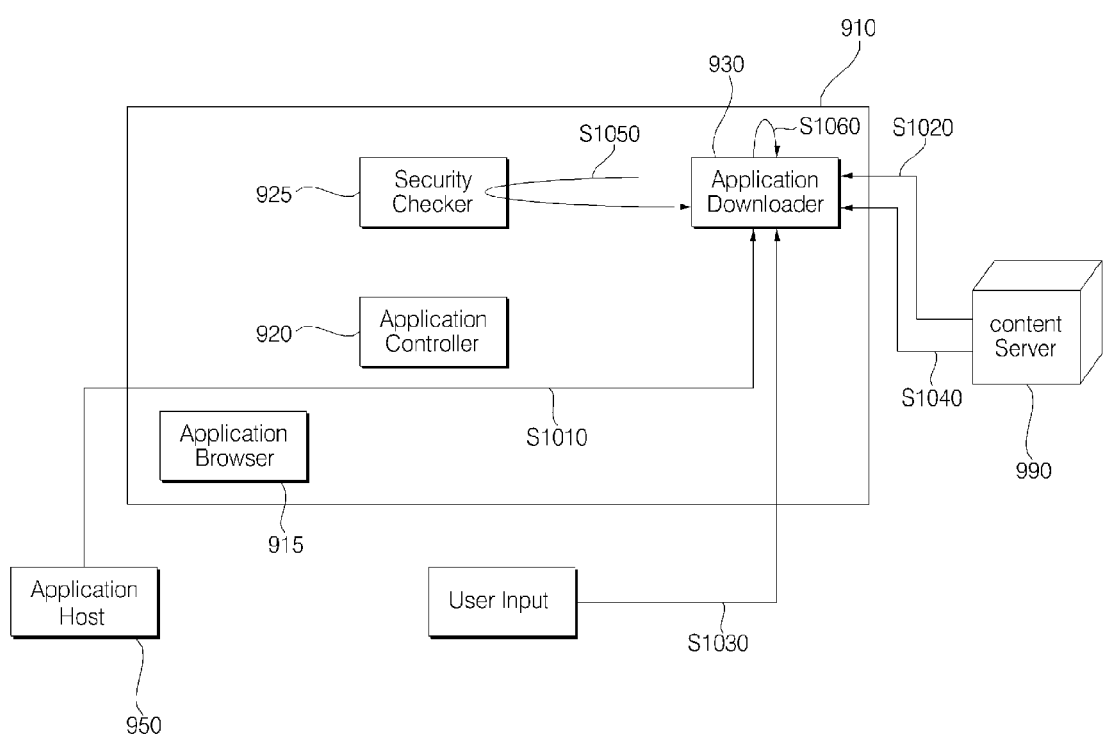
FIG. 10 illustrates an operation for downloading and installing an application in the image display apparatus according to an exemplary embodiment of the present invention.

FIG. 10 illustrates an operation for downloading and installing an application in the image display apparatus according to an exemplary embodiment of the present invention.

The download and installation operation is for the case where the image display apparatus 100 accesses a content server 990 via the application manager 910 and downloads contents (particularly, applications) from the content server 990.

Referring to FIG. 10, the application host 950 in the image display apparatus 100 transmits a download instruction to the application downloader 930 of the application manager 910 in step S1010.

As described before, the application host 950 may be added to the host software of the image display apparatus 100 to control reception and execution of applications. For example, the application host 950 may be added to the host software of the image display apparatus 100 and control application reception and execution, independently of broadcast signal output.

The download instruction may be transmitted when the user selects the application downloader 930 on a UI using the remote controller 200, or when the application downloader 930 automatically runs.

Upon receipt of the download instruction, the application downloader 930 transmits an application list request to the content server 990 or a network server and downloads the application list from the content server 990 or the network server in step S1020. The application list request may be an application list update request.

A network address of the content server 990 or the network server may be preset, received from the user, or acquired by predetermined signaling or through a predetermined channel.

The downloaded application list is displayed on the display 180. With the application list displayed on the display 180, a user input signal or a control signal corresponding to selection of an application from the application list is received from the remote controller 200 in step S1030.

The application downloader 930 downloads the selected application from the content server 990 or the network server in step S1040. When downloading the selected application, the application downloader 930 may use metadata included in the application list.

The security checker 925 authenticates the downloaded application using authentication data that is carried in a header of the application or certain metadata for the application in step S1050.

If the downloaded application turns out valid in the authentication, the application downloader 930 installs the downloaded application using the header of the application or the metadata in step S1060.

If an installation path is signaled by the header of the application or the metadata, the application downloader 930 may install the application according to the installation path.

The application browser 915 may output a list of downloaded applications to the display 180. Upon receipt of a user input signal or control signal requesting execution of one or more downloaded applications from the remote controller 200, the application controller 920 executes the selected applications according to a control command received from the application host 950.

Because the application manager 910 operates independently of other functions of the image display apparatus 100 as stated before, it may execute all of selected applications even though a plurality of applications are selected for execution.

FIGS. 11A to 14 are views referred to for describing an operation of the image display apparatus according to an exemplary embodiment of the present invention.

FIGS. 11A and 11B illustrate a screen of the display 180 on which an application list available in a network is displayed.

The user may access the content server 990 or the network server directly, search for various applications, and download them.

Referring to FIG. 11A, a list of various applications 1110 available within the connected server is displayed on the display 180. The application list 1110 may include icons representing the applications and brief descriptions of the applications. As the image display apparatus 100 allows full browsing, the icons or descriptions may be displayed enlarged, so that the user can easily identify the applications.

Referring to FIG. 11B, the user selects an application 1120 from the application list 1110 using the pointer 205 corresponding to the remote controller 200. Therefore, the selected application may be downloaded easily.

FIGS. 12A and 12B illustrate a screen of the display 180 on which a list of applications available in the image display apparatus 100 is displayed.

Referring to FIG. 12A, if the user selects an application list view menu by manipulating the remote controller 200, a list 1210 of applications stored in the image display apparatus 100 is displayed on the display 180. While only icons representing the applications are shown in FIG. 12A, to which the present invention is not limited, a brief description may be provided for each application, as in FIGS. 11A and 11B. Accordingly, the user can easily identify the applications.

Referring to FIG. 12B, the user selects an application 1220 from the application list 1210 using the pointer 205 corresponding to the remote controller 200. Thus, the selected application can be executed easily.

Figure 11:
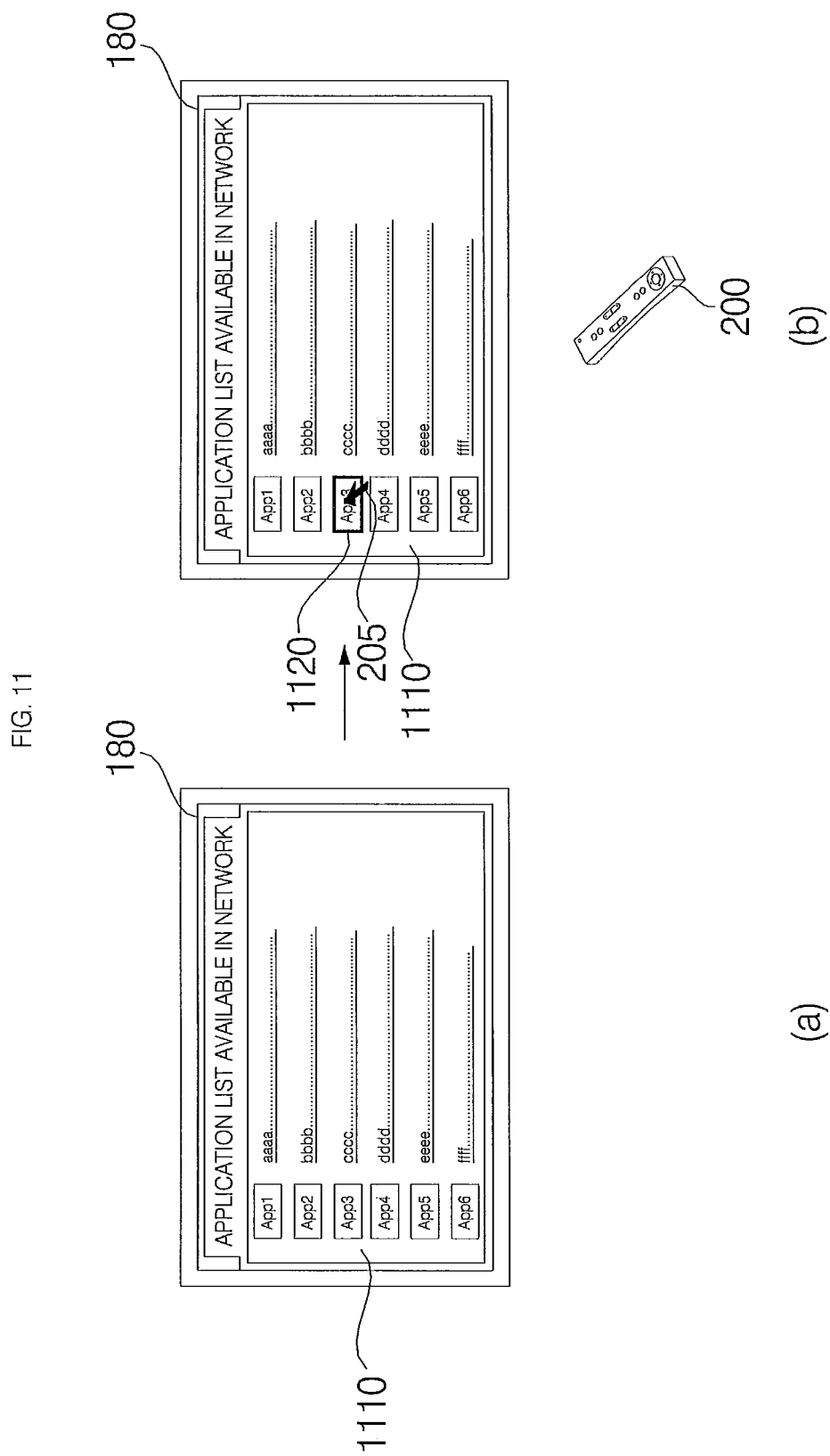
Figure 12:
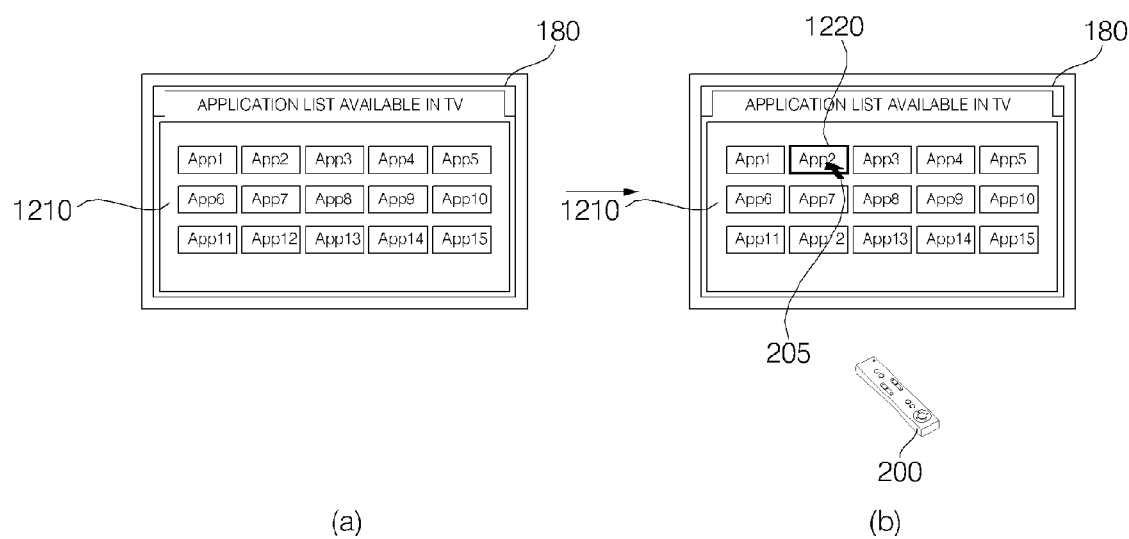
Figure 14:
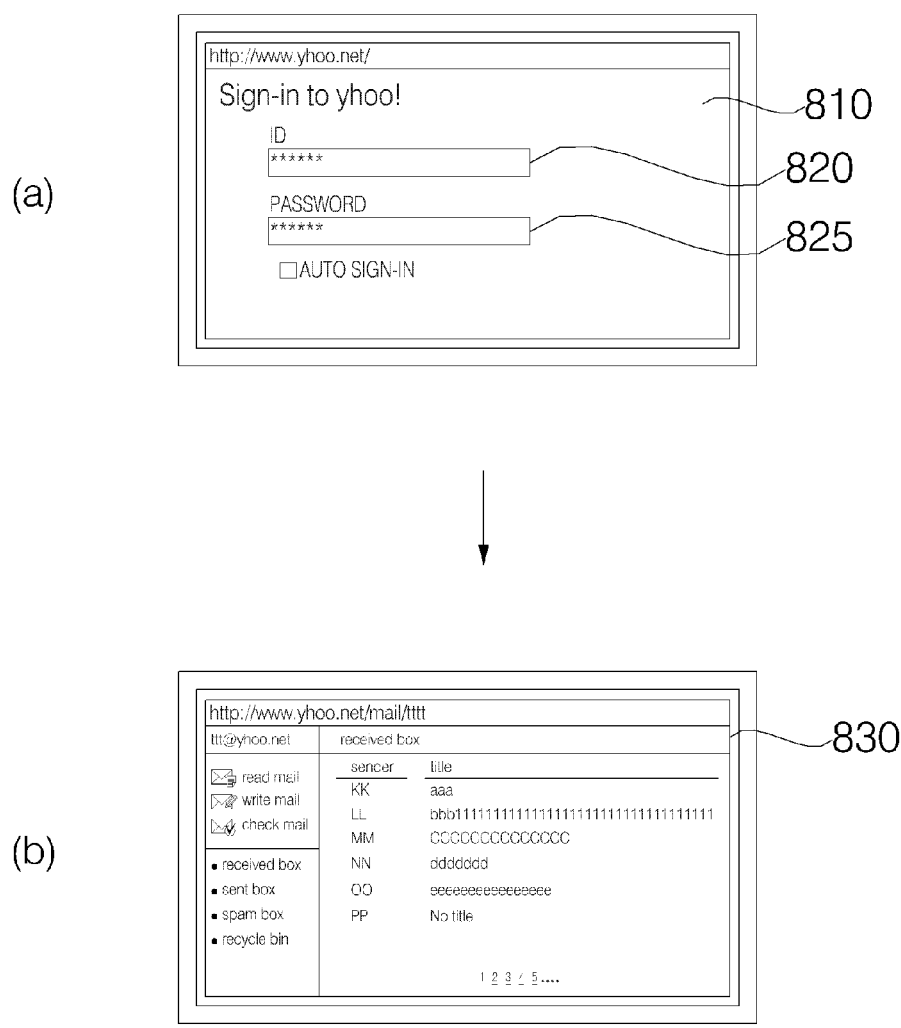

While it has been described that a specific item is selected by moving the pointer 205, which moves according to a user's motion, with the remote controller 200 illustrated in FIGS. 11 and 12, this is merely an exemplary application. Therefore, the present invention is not limited to it and many other examples may be contemplated.

For example, a specific item may be selected using a cursor displayed on a screen by manipulating both a directional key and an OK key provided in the remote controller 200 or provided as local keys.

In another example, if the remote controller 200 includes a touchpad, a specific item may be selected by touching the touchpad and thus moving the pointer 205 on the display 180.

FIGS. 13A and 13B illustrate Web pages displayed on the display of the image display apparatus.

FIG. 13A illustrates a Web page 710 including a search window through which a search can be performed. A user may enter specific text in the search window 720 using a keypad (not shown) displayed on the Web page 710, character keys (not shown) provided as local keys, or character keys (not shown) provided in the remote controller.

FIG. 13B illustrates a search result page 730 displayed on the display 180. The image display apparatus is capable of full browsing when displaying a Web page in accordance with the exemplary embodiment of the present invention. Therefore, the user can read the Web page easily.

FIGS. 14A and 14B illustrate Web pages displayed on the display of the image display apparatus.

FIG. 14A displays a mail service page 810 including an IDentifier (ID) input window 820 and a password input window 825, displayed on the display 180. The user may enter a specific numeral and/or text into the ID input window 820 and the password input window 825 using a keypad (not shown) displayed on the mail service page 810, character keys (not shown) provided as local keys, or character keys (not shown) provided in the remote controller. Hence, the user can log in to a mail service.

FIG. 14B illustrates a mail page 830 displayed on the display 180, after log-in. For example, the mail page 830 may display items "read mail", "write mail", "sent box", "received box", "recycle bin", etc. In the "received box" item, mails may be ordered by sender and title.

The image display apparatus is capable of full browsing when displaying a mail service page in accordance with the exemplary embodiment of the present invention. Therefore, the user can enjoy the mail service conveniently.

Figure 15:
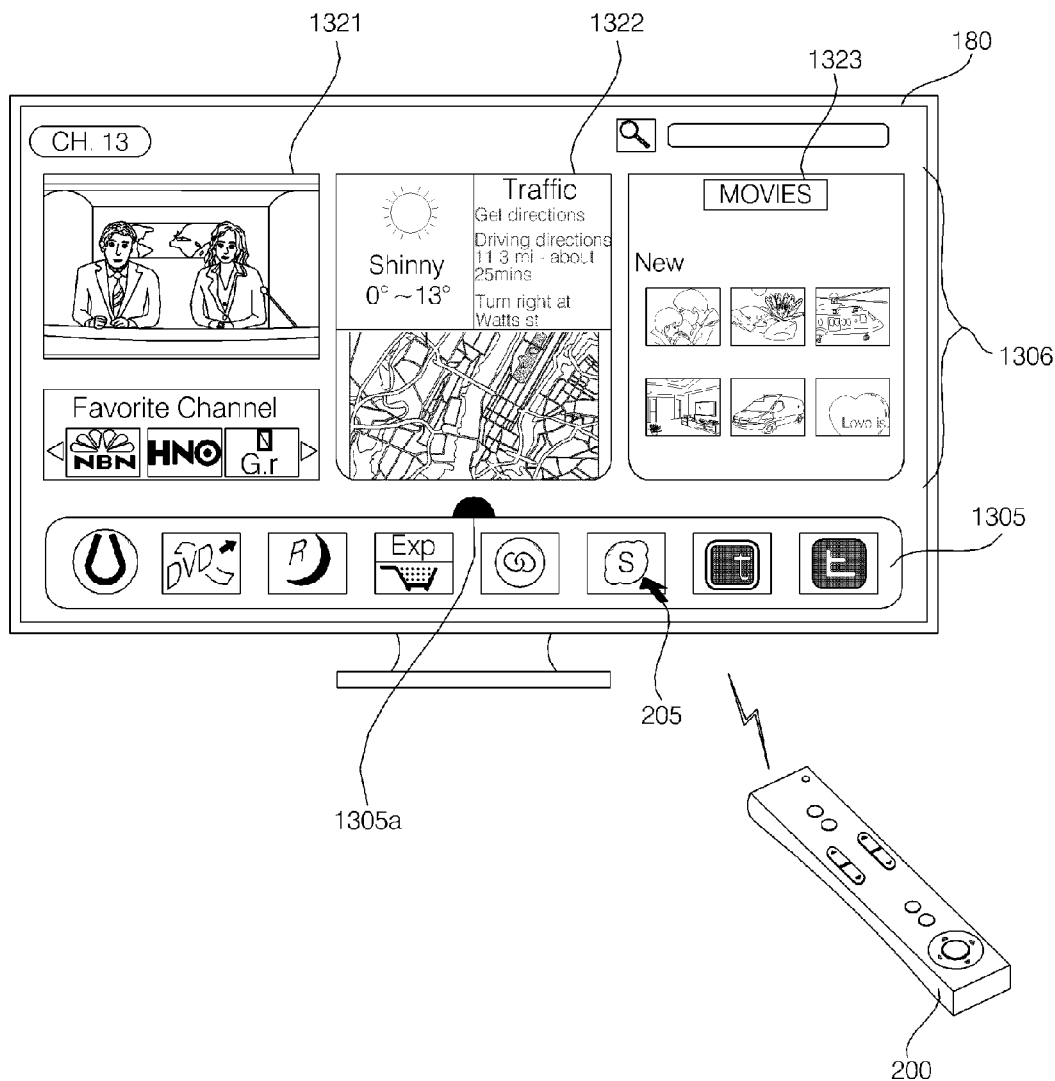

FIG. 15 illustrates an exemplary default screen of the image display apparatus 100.

The image display apparatus 100 may divide the screen of the display 180 into at least two areas, for displaying images according to an exemplary embodiment of the present invention.

A first display area 1305 in a lower part of the display 180 may display icon objects. Icon objects may include objects representing applications. The user selects one of the icon objects of the applications using the pointer 205 corresponding to the remote controller 200 in FIG. 15, by way of example. Hence, the selected application may be executed.

A second display area 1306 lies on the first display area 1305, for displaying a variety of images or information.

The second display area 1306 may be divided vertically into first, second and third areas 1321, 1322 and 1323.

The first area 1321 may display contents such as broadcast images. The contents may be displayed on the first area 1321 in a detail-view mode. Specifically, the entire contents of a received broadcast image or an image corresponding to a running application may be displayed up to details. Notably, the resolution of the input image may be changed, taking into account the display area of the display 180.

The second area 1322 may display real-time or up-to-date information received over a network. This information may be updated periodically. Depending on the amount of the information, the information may be displayed in summary, that is, in a summary-view mode.

The third area 1323 may display information that can be acquired from an application. The information may be displayed in summary, that is, in the summary-view mode, according to the amount of the information.

The first display area 1305 may further include a enlarging/reducing command object 1305a. The enlarging/reducing command object 1305a may be regarded as an extension of the first display area 1305. When the user drags the enlarging/reducing command object 1305a, a command for enlarging or reducing the first display area 1305 may be input to the image display apparatus 100 and thus the size of the first display area 1305 may be changed. In addition, the size of the second display area 1306 may be changed along with a change in the size of the first display area 1305, which will be described later with reference to FIG. 16.

Similarly, the user may change the size of at least one of the first, second and third areas 1321, 1322 and 1323 in the second display area 1306 using the pointer 205 corresponding to the remote controller 200.

While not shown, a enlarging/reducing command object may be provided in each of the first, second and third areas 1321, 1322 and 1323. Using the enlarging/reducing command objects, the first, second and third areas 1321, 1322 and 1323 may be enlarged or reduced to a user-desired size. It is also possible to enlarge or reduce each area by dragging an edge or vortex of the area using the pointer 205.

Figure 16:
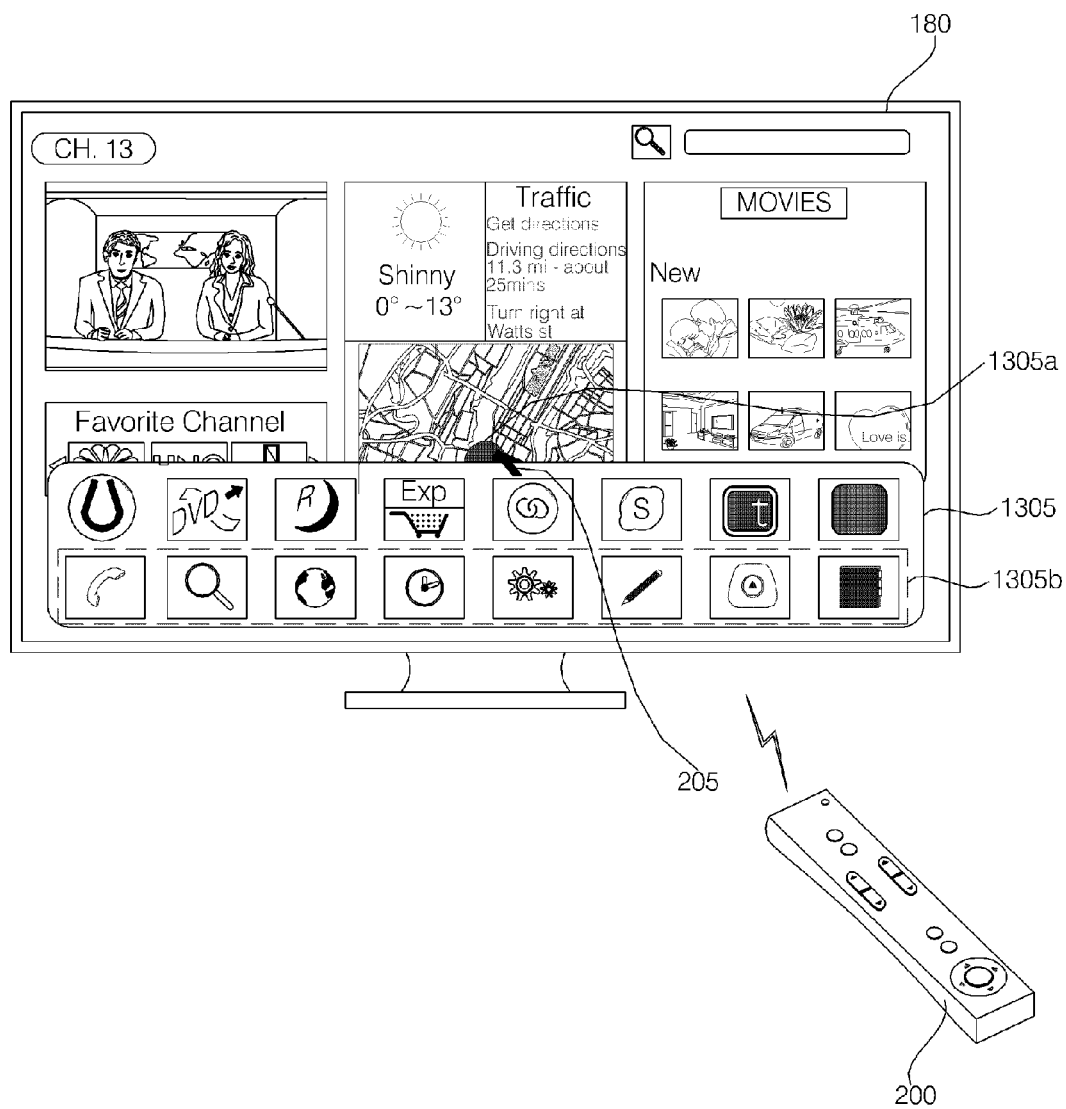

FIG. 16 illustrates an exemplary composition of the default screen illustrated in FIG. 15 in the image display apparatus.

Referring to FIG. 16, compared to the screen composition illustrated in FIG. 15, the screen composition is characterized in that as the first display area 1305 is enlarged, the second display area 1306 may be reduced.

For example, if the user drags upward the zoom-in/zoom-out command object 1305a using the pointer 205 as illustrated in FIG. 16, the first display area 1305 is displayed enlarged, while the second display area 1306 is displayed reduced accordingly.

Icon objects are displayed in the first display area 1305. As the first display area 1305 gets enlarged, more icon objects may be displayed in the first display area 1305.

Figure 17:
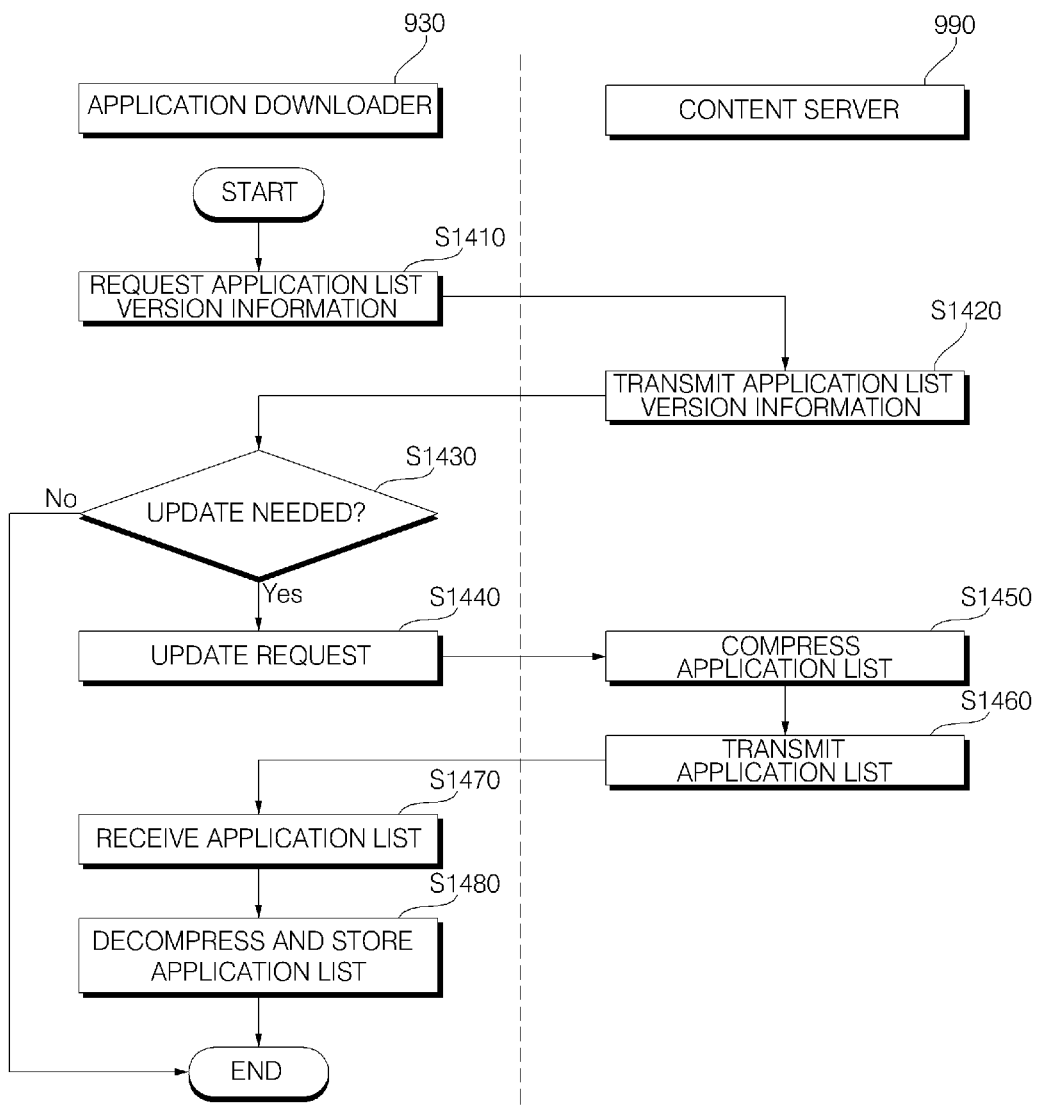
FIG. 17 is a flowchart illustrating a method for operating the image display apparatus according to an exemplary embodiment of the present invention.
Figure 19:
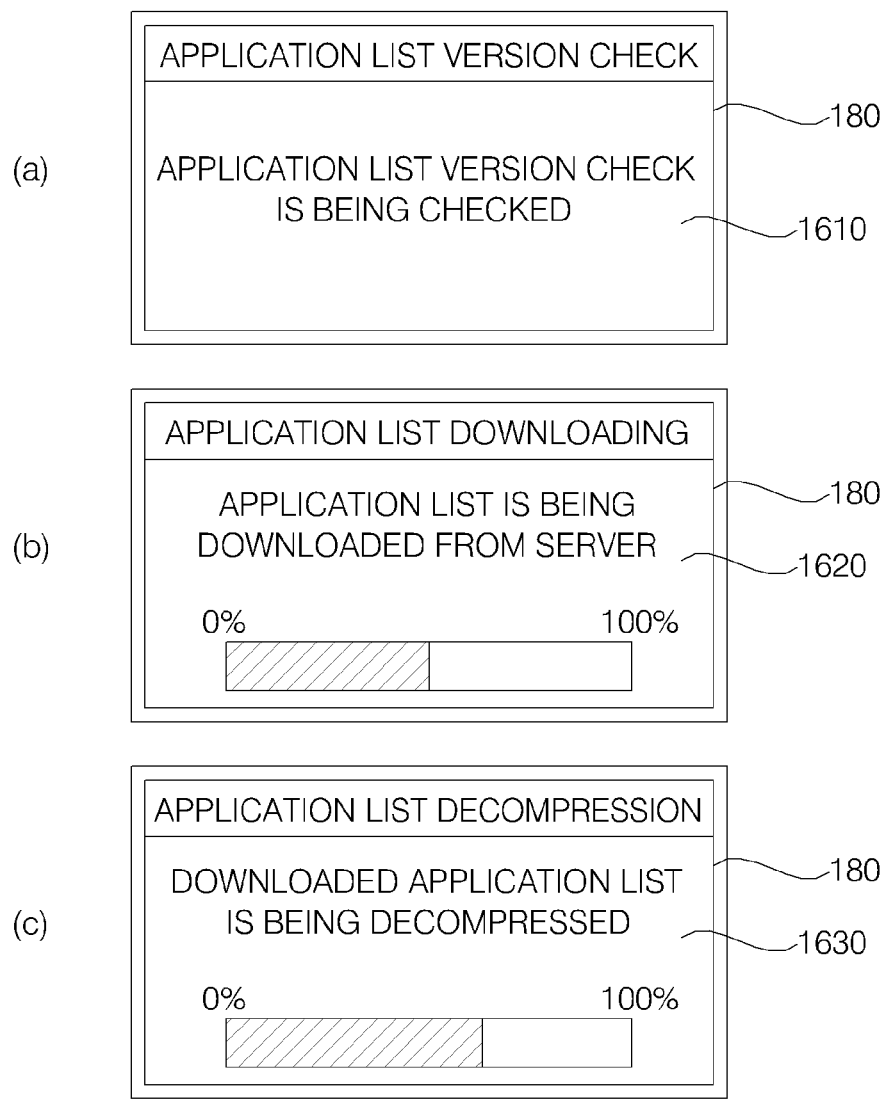

FIG. 17 is a flowchart illustrating a method for operating the image display apparatus according to an exemplary embodiment of the present invention, and FIGS. 18 and 19 are views referred to for describing the method for operating the image display apparatus, illustrated in FIG. 17.

Referring to FIG. 17, the application downloader 930 requests information about the version of an application list to the content server 990 or the network server in step S1410.

The application list version request may be transmitted to the content server 990 or the network server, when the user selects an application download menu using the remote controller 200, or when an application list update message is received from the content server 990 or the network server.

The content server 990 or the network server transmits the information about the version of an application list to be transmitted to the application downloader 930 in step S1420.

Upon receipt of the application list version information, the application downloader 930 determines whether to update a currently stored application list by comparing the received version information with information about the version of the currently stored application list in step S1430.

If the received version information is different from the stored version information or if the current application list is of a lower version and thus needs updating, the application downloader 930 requests an application list update to the content server 990 or the network server by an update message in step S1440. The update message may be transmitted by HyperText Transfer Protocol (HTTP), GET/POST, or Simple Object Access Protocol (SOAP).

The content server 990 or the network server compresses the application list in step S1450 and transmits the compressed application list to the application downloader 930 in step S1460.

Along with the update request, the application downloader 930 may transmit system information about the image display apparatus 100 or the application host 950 to the content server 990 or the network server. Then the content server 990 or the network server may make the application list by extracting applications that can be executed according to a control command from the application host 950.

The application downloader 930 receives the compressed application list in step S1470 and decompresses and stores the application list in step S1480. The compression and decompression of the application list may be carried out in various manners according to exemplary embodiments of the present invention. The application list may be stored in eXtensible Markup Language (XML).

Upon completion of downloading the application list, the application downloader 930 may transmit information about a device Identifier (ID) of the image display apparatus 100 and the version of the downloaded application list to the content server 990 or the network server. The content server 990 or the network server may preserve the received information and determine the version of the current application list that the image display apparatus 100 has at the next time when the image display apparatus 100 downloads an application list.

FIG. 18 illustrates an exemplary screen for managing an application list.

Referring to FIG. 18, when the user selects an application download item 1501 using the pointer 205 of the remote controller 200 from the display 180 on which an application list 1510 provided by the application browser 915 is displayed, an application list may be downloaded in the procedure illustrated in FIG. 17.

FIGS. 19A, 19B and 19B illustrate screens for notifying the user of the download procedure of the application list.

FIG. 19A illustrates a screen 1610 indicating that the application list is being checked.

When the application list needs to be updated, a screen 1620 indicating an application list is being downloaded may be displayed, as illustrated in FIG. 19B.

When the application list is completely downloaded and decompressed, a screen 1630 indicating the application list is being decompressed may be displayed as illustrated in FIG. 19C.

In this manner, the application list may be received efficiently, especially as the application list can be downloaded only when it has been changed.

As is apparent from the above description of the exemplary embodiments of the present invention, since a user-installable or user-deletable application or application list is downloaded over a network according to a user input signal received from a remote controller, a user can easily use his desired application with increased use convenience.

Especially as the user selects an intended application using the remote controller from an application list available in a network displayed on a display, the user can easily download the application from the network.

Also, the user selects an intended application using the remote controller from an application list available in an image display apparatus displayed on the display, the user can easily execute the selected application.

The version of an application is checked and updated, when needed. Thus the application list can be received efficiently.

Further, the image display apparatus provides various UIs, thereby increasing user friendliness.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data memory, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus comprising:
a display;
a user input interface configured to receive a control signal from a remote controller;
a tuner configured to receive a broadcast signal;
a network interface configured to transmit or receive data over a network;
a controller configured to control the display to display a pointer according to the received control signal; and
a memory including a platform configured to control data transmission or reception over the network according to the received control signal,
wherein the platform includes an Operating System (OS) kernel and an application layer that runs on the OS kernel, the application layer including an installable or deletable application downloaded over the network and an undeletable application stored in the image display apparatus,
wherein the display simultaneously displays a broadcast image from the broadcast signal in a first area, content received over the network and capable of being updated in a second area, and an application list including at least one of the deletable application and the undeletable application in a third area,
wherein the user input interface receives motion information from the remote controller,
wherein the controller determines a movement of the remote controller based on the motion information, and calculates coordinates of the pointer, and
wherein the display displays the pointer at the calculated coordinates.

2. The image display apparatus according to claim 1, wherein a display area of the application list and a number of applications in the application list are varied according to a user input.

3. The image display apparatus according to claim 1, wherein the platform further includes middleware configured to mediate data transmission between different hardware or different software or, to provide a standard interface, and a driver configured to drive a device to run applications of the application layer, and
wherein the driver includes a remote controller driver configured to drive the remote controller.

4. The image display apparatus according to claim 1, wherein the display further displays a search window with the broadcast image, the content, and the application list.

5. The image display apparatus according to claim 1, wherein the display moves and displays the pointer according to the control signal from the remote controller.

6. The image display apparatus according to claim 1, wherein the OS kernel performs at least one of hardware driver running, security protection for hardware and processors, efficient management of system resources, memory management, hardware interfacing by hardware abstraction, multi-processing, and scheduling associated with the multi-processing.

7. The image display apparatus according to claim 1, wherein at least one of the first area and the second area are varied according to a user input.

8. The image display apparatus according to claim 1, wherein at least one of the first area and the second area is varied by dragging an edge or vortex of the area using the pointer displayed on the display.

9. The image display apparatus according to claim 3, wherein the middleware includes a virtual machine configured to execute a plurality of instances, and
wherein a binder driver of the OS kernel schedules the plurality of instances.

10. The image display apparatus according to claim 1, wherein the platform is divided into a legacy system platform configured to run at least one application of a menu-related user interface, a broadcasting guide, Bluetooth, reservation, digital video recording, and hot keys on the OS kernel, and a smart system platform for running at least one application of e-mail, Short Message Service (SMS), a calendar, a map, and a browser on the OS kernel.

11. The image display apparatus according to claim 10, wherein the smart system platform includes a library on the OS kernel, and a framework between the library and the application layer.

12. The image display apparatus according to claim 10, wherein the legacy system platform includes a driver on the OS kernel and middleware between the driver and the application layer.

13. The image display apparatus according to claim 1, wherein when an application download item is selected using the pointer representing a movement of the remote controller, the application list is downloaded.

14. An image display apparatus comprising:
a display;
a user input interface configured to receive a control signal from a remote controller;
a tuner configured to receive a broadcast signal;
a network interface configured to transmit or receive data over a network;
a controller configured to control the display to display a pointer according to the received control signal; and
a memory including a platform configured to control data transmission or reception over the network according to the received control signal,
wherein the platform includes an Operating System (OS) kernel and an application layer that runs on the OS kernel, the application layer including an installable or deletable application downloaded over the network and an undeletable application stored in the image display apparatus,
wherein the display simultaneously displays a broadcast image from the broadcast signal in a first area, content received over the network and capable of being updated in a second area, and an application list including at least one of the deletable application and the undeletable application in a third area,
wherein the platform is divided into a legacy system platform configured to run at least one application of a menu-related user interface a broadcasting guide, Bluetooth reservation digital video recording, and hot keys on the OS kernel, and a smart system platform for running at least one application of e-mail, Short Message Service (SMS), a calendar, a map, and a browser on the OS kernel,
wherein the legacy system platform includes a driver on the OS kernel and middleware between the driver and the application layer, and
wherein the middleware includes at least one of data broadcasting-related middleware, broadcast information-related middleware, and peripheral communication-related middleware.

15. A method for operating an image display apparatus, comprising:
receiving a broadcast signal;

transmitting an application list request to a content server or a network server;
downloading an application list from the content server or the network server;
receiving motion information from a remote controller;
determining a movement of the remote controller based on the motion information;
calculating coordinates of a pointer;
simultaneously displaying a broadcast image from the broadcast signal in a first area, content received over the network and capable of being updated in a second area, and the application list including at least one of a deletable application and an undeletable application in a third area;
selecting an application from the application list according to a user input;
transmitting an application selection command corresponding to the selected application to the content server or the network server;
downloading an application corresponding to the application selection command from the content server or the network server over a network; and
installing the downloaded application,
wherein a display area of the application list and a number of applications in the application list are varied according to a user input,
wherein the displaying further displays the pointer representing the movement of the remote controller according to the calculated coordinates, and
wherein when an application downloaded item is selected using the pointer, the application list is downloaded.

16. The method according to claim 15, wherein at least one of the first area and the second area is varied according to a user input.

17. The method according to claim 15, further displaying a search window with the broadcast image, the content, and the application list.

18. The method according to claim 15, further comprising:
receiving a control signal from the remote controller; and
moving and displaying the pointer according to the control signal received from the remote controller.

* * * * *

UNITED STATES PATENT AND TRADEMARK OFFICE
CERTIFICATE OF CORRECTION

| | | |
|---|---|---|
| PATENT NO. | : 8,552,975 B2 | Page 1 of 1 |
| APPLICATION NO. | : 12/870413 | |
| DATED | : October 8, 2013 | |
| INVENTOR(S) | : Kyongjo Jung et al. | |

It is certified that error appears in the above-identified patent and that said Letters Patent is hereby corrected as shown below:

ON THE TITLE PAGE:

At item (30), Foreign Application Priority Data, change:

"Aug. 31, 2009   (KE)   .................... 10-2009-0081421"

to --Aug. 31, 2009   (KR)   .................... 10-2009-0081421--.

Signed and Sealed this
Eleventh Day of February, 2014

Michelle K. Lee
*Deputy Director of the United States Patent and Trademark Office*